United States Patent
Yamashita

(10) Patent No.: US 7,752,189 B2
(45) Date of Patent: Jul. 6, 2010

(54) SIGNAL PROCESSING APPARATUS AND METHOD THEREOF

(75) Inventor: Kosei Yamashita, Kanagawa (JP)

(73) Assignee: Sony Corporation (JP)

( * ) Notice: Subject to any disclaimer, the term of this patent is extended or adjusted under 35 U.S.C. 154(b) by 1285 days.

(21) Appl. No.: 11/135,259

(22) Filed: May 23, 2005

(65) Prior Publication Data

US 2005/0278451 A1 Dec. 15, 2005

(30) Foreign Application Priority Data

Jun. 9, 2004 (JP) ............................ P2004-170692

(51) Int. Cl.
*G06F 17/30* (2006.01)

(52) U.S. Cl. ........................................ 707/706; 700/94

(58) Field of Classification Search .................... 700/94
See application file for complete search history.

(56) References Cited

U.S. PATENT DOCUMENTS

| | | | |
|---|---|---|---|
| 4,796,179 A | 1/1989 | Lehman et al. | |
| 5,331,111 A | 7/1994 | O'Connell | |
| 5,999,906 A | 12/1999 | Mercs et al. | |
| 6,829,290 B1 * | 12/2004 | Schmidl et al. | ............. 375/147 |

FOREIGN PATENT DOCUMENTS

| | | |
|---|---|---|
| EP | 1 087 292 | 3/2001 |
| EP | 1 317 109 | 6/2003 |
| WO | WO-2004/012405 | 2/2004 |

OTHER PUBLICATIONS

Ching-Yi Wang, High-Level DSP Synthesis Using Concurrent Transformations, Scheduling, and Allocation, Mar. 1995, IEEE pp. 274-295.*

Ching-Yi Wang, et al, "High-level DSP synthesis using concurrent transformations, scheduling, and allocation", IEEE Transactions on Computer-Aided Design of Intergrated circuits and Systems USA, vol. 14, No. 3, Mar. 1995, pp. 274-295.

Sztipanovits, J et al, "Self-Adaptive Software for Signal Processing" Communications of the Association for Computing Machinery, ACM, New York, NY, US vol. 41, No. 5, May 1, 1998, pp. 66-73.

(Continued)

*Primary Examiner*—John E Breene
*Assistant Examiner*—Thu-Nguyet Le
(74) *Attorney, Agent, or Firm*—Lerner, David, Littenberg, Krumholz & Mentlik, LLP

(57) ABSTRACT

A signal processing apparatus performs a signal processing using a plurality of signal processing modules associated with a corresponding plurality of signal processing functions. The plurality of signal processing modules are graphically displayed. One or more of a plurality of available commands are received from a user. A virtual connection state of the plurality of signal processing modules is set that defines connections among the inputs and outputs of the plurality of signal processing modules. The virtual connection state is stored and managed. A sequence of corresponding signal processing functions is determined based on the virtual connection state. Signal processing is performed in accordance with the determined sequence of signal processing functions.

14 Claims, 25 Drawing Sheets

OTHER PUBLICATIONS

Chanik Park et al., "Efficient Dataflow Representation of MPEG-1 Audio (layer III) Decoder Algorithim with Controlled Global States", Signal Processing System, 1000, SIPS 99. 1999 IEEE Workshop on Taipei, Taiwan Oct. 20-22, 1999, pp. 341-350.

Camus J, et al., "Combining SDL with Syncronous Data Flow Modelling for Distributed Control Systems", Lecturer Notes in Computer Science vol. 2078, Springer-Verlag, Berlin, Germany, 2001, pp. 1-18.

* cited by examiner

FIG. 16

| NODE INDEX (SIGNAL PROCESSING SEQUENCE) | NODE |
|---|---|
| 1 | NODE NO. 0 |
| 2 | NODE NO. 2 |
| 3 | NODE NO. 4 |
| 4 | NODE NO. 6 |
| 5 | NODE NO. 1 |
| 6 | NODE NO. 3 |
| 7 | NODE NO. 5 |

| NODE INDEX | NODE |
|---|---|
| 1 | NODE NO. 0 |
| 2 | NODE NO. 2 |
| 3 | NODE NO. 1 |
| 4 | NODE NO. 4 |
| 5 | NODE NO. 6 |
| 6 | NODE NO. 3 |
| 7 | NODE NO. 5 |

| NODE INDEX | NODE |
|---|---|
| 1 | NODE NO. 0 |
| 2 | NODE NO. 2 |
| 3 | NODE NO. 4 |
| 4 | NODE NO. 6 |
| 5 | NODE NO. 1 |
| 6 | NODE NO. 3 |
| 7 | NODE NO. 5 |

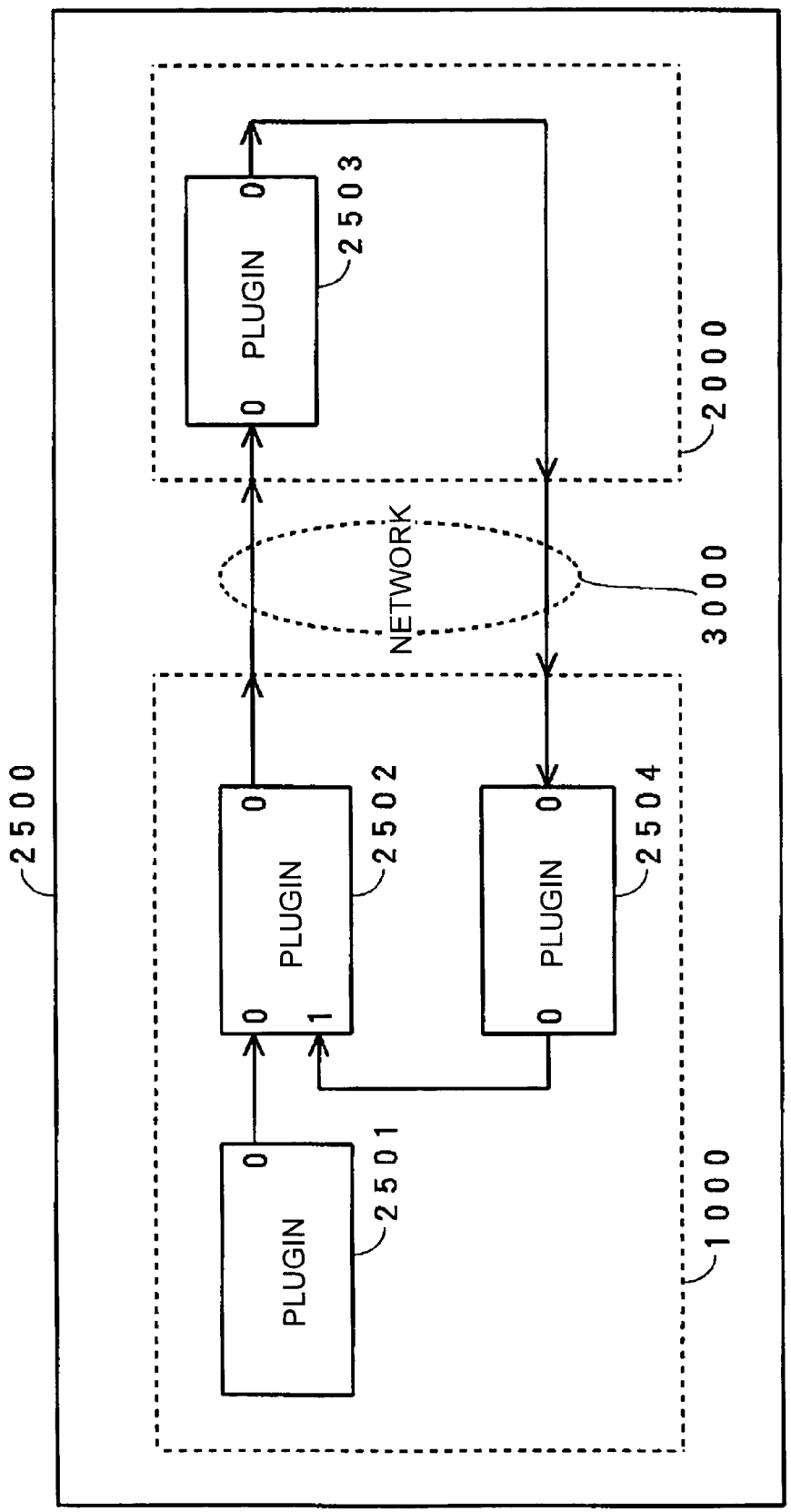

SIGNAL PROCESSING APPARATUS AND METHOD THEREOF

CROSS REFERENCES TO RELATED APPLICATIONS

The present invention contains subject matter related to Japanese Patent Application JP 2004-170692 filed in the Japanese Patent Office on Jun. 9, 2004, the entire contents of which are incorporated herein by reference.

BACKGROUND OF THE INVENTION

1. Field of the Invention

The present invention relates to a signal processing apparatus that performs, in software, a signal process composed of a plurality of signal processing units.

2. Description of the Related Art

With ever-higher performance, computers can now play back moving images and music, the playback of which was difficult before. Moving images and audio signals are currently easily real-time processed without using a dedicated signal processing device and dedicated hardware, such as a digital signal processor (DSP).

A variety of signal processing middleware techniques support the signal processing applications. For example, DirectShow is available from Microsoft® (see http//msdn.microsoft.com/library/default.asp?url=/ library/en-us/directx9_c/directX/htm/directshow.asp), MATLAB is available from the MathWork® (see http://www.mathworks.com/), and Max/MSP is available from Cycling'74 (see http://www.cycling74.com/products/maxmsp.html).

The function of the signal processing application is relatively easily performed by using such middleware techniques. For example, audio signals are recorded, replayed, input and output, mixed, and subjected to special effects using the signal processing applications. As for moving images, signal processing applications having sophisticated editing functions such as non-linear editing are provided.

Applications having a plugin structure have been proposed as this type of middle ware (see Japanese Unexamined Patent Application Publications Nos. 2001-109628 and 7-302195). The plugin here refers to a modularized function, and is a software application program. Throughout this specification, the plugin refers to a software application program forming a signal processing module.

With plugin, a user can use a required signal processing module in an add-on manner as necessary. The plugin is typically used as a unit. Currently available several new systems provide a complex function by combining a plurality of plugins. Such a complex plugin system is expected to become a majority of systems creating a new value.

SUMMARY OF THE INVENTION

The currently available complex plugins have the drawbacks as discussed below.

(a) If plugins are cascaded, a process delay (latency) is increased accordingly.

(b) Limitation on the connection between plugins does not permit a feedback loop connection.

(c) Connection state between the plugins cannot be modified in the middle of signal processing.

(d) Multiple functions cannot be performed on a real-time basis due to low processing speed.

(e) Controlling a sample accuracy level cannot be performed in audio and image synchronization, and in updating of parameters.

(f) Signal processing is performed on only a single computer in a closed environment.

Several middlewares overcoming some of the above drawbacks are currently available. However, any middlewares free from all the drawbacks are not available. Because some drawbacks are contradictory to each other (if one drawback is overcome, another is adversely affected). For example, it is extremely difficult to overcome drawbacks (b) and (d) at the same time.

Some of the drawbacks may present a major obstacle in the incorporation of a plugin into a conventional middleware product.

It is desirable to provide a signal processing apparatus free from the above-referenced drawbacks.

In accordance with one embodiment of the present invention, a signal processing apparatus for performing, in software, a signal process composed of a plurality of signal processing units, includes a plurality of signal processing modules for processing, in software, the plurality of signal processing units, an input command receiving unit for receiving, from a user, a command to generate or delete the signal processing module, and a command to connect the input and output of the signal processing module, a signal processing module interconnection unit for setting a virtual connection state of the input and output of each of the plurality of signal processing modules in response to the command received from the user by the input command receiving unit, a circuit arrangement information storage and management unit for storing and managing the virtual connection state of the input and output of each of the plurality of set signal processing modules, a signal processing sequence determining unit for determining, through an initial path search and a loop search, a signal processing sequence of the plurality of signal processing modules stored in the circuit arrangement information storage and management unit, and a signal processing executing unit for successively causing the signal processing modules to perform the signal process in accordance with the signal processing sequence determined by the signal processing sequence determining unit. The signal processing sequence determining unit searches, through the initial path search, the signal processing sequence of the plurality of signal processing modules, stored in the circuit arrangement information storage and management unit, through the initial path search, searches, through the loop search, the signal processing modules forming a closed loop in a circuit arrangement of the plurality of signal processing modules stored in the circuit arrangement information storage and management unit, and updates the signal processing sequence, determined through the initial path search, so that the signal processing module not forming the closed loop is ahead of, in processing sequence, the signal processing module at the front of the closed loop if the signal processing modules forming the closed loop are detected during the loop search, and if the signal processing module not forming the closed loop, contained in processing sequence between the signal processing module at the front of the closed loop and the signal processing module at the end of the close loop, is detected during the initial path search.

Since the plurality of signal processing modules successively perform the software signal processing with the signal processing sequence fixed, each signal processing module is free from an unnecessary process delay that is caused when the signal is processed after being stored in an asynchronization buffer.

The signal processing sequence is arranged to be different from signal processing module to signal processing module or signal processing group to signal processing group. More specifically, the signal processing modules forming the closed loop are handled as one group in terms of the signal processing sequence.

Even if the group of signal processing modules not forming the closed loop processes the signals at a time as a feedforward circuit, causality in signal processing is assured. More specifically, since a function call or a calculation process is performed by packet unit or sample group unit, the speed of the signal processing is increased.

In accordance with another embodiment of the present invention, a signal processing apparatus for performing, in software, a signal process composed of a plurality of signal processing units, includes a plurality of signal processing modules for processing, in software, the plurality of signal processing units, an input command receiving unit for receiving, from a user, a command to generate or delete the signal processing module, and a command to connect the input and output of the signal processing module, a signal processing module interconnection unit for setting a virtual connection state of the input and output of each of the plurality of signal processing modules in response to the command received from the user by the input command receiving unit, a circuit arrangement information storage and management unit for storing and managing the virtual connection state of the input and output of each of the plurality of set signal processing modules, a signal processing sequence determining unit for determining a signal processing sequence of the plurality of signal processing modules stored in the circuit arrangement information storage and management unit, and a signal processing executing unit for successively causing the signal processing modules to perform the signal process in accordance with the signal processing sequence determined by the signal processing sequence determining unit. If the command to generate or delete the signal processing module from the user and/or a circuit arrangement update request to update a plurality of circuits based on the connection command of the input and output of each of the plurality of signal processing modules from the user is issued in the middle of the signal process performed by the signal processing executing unit, the signal processing sequence determining unit searches a new signal processing sequence, and the signal processing executing unit executes the signal process in accordance with the new signal processing sequence.

When the circuit arrangement update request is issued from the user, the signal processing sequence determining unit works to search the new signal processing sequence, and the signal processing executing unit performs the signal process in accordance with the new signal processing sequence.

Even in the middle of the signal process, the circuit arrangement can be updated, and the signal process is continuously performed by the updated circuit arrangement.

Even if the signal processing modules are cascaded, the signal processing apparatus is free from a signal processing delay. The signal processing with the closed loop is performed in software. The circuit arrangement can be dynamically updated.

BRIEF DESCRIPTION OF THE DRAWINGS

FIG. 16 is a flowchart illustrating the initial path search algorithm of the signal processing apparatus in accordance with the embodiment of the present invention;

FIG. 25 illustrates a real-time distributed process of the signal processing apparatus in accordance with the embodiment of the present invention.

DESCRIPTION OF THE PREFERRED EMBODIMENTS

A signal processing apparatus of embodiments of the present invention is described below with reference to the drawings.

A general-purpose signal processing middleware of the signal processing apparatus is a software signal processor (SSP). In the following discussion of the embodiments, the signal processing apparatus processes an audio signal.

Figure 2:
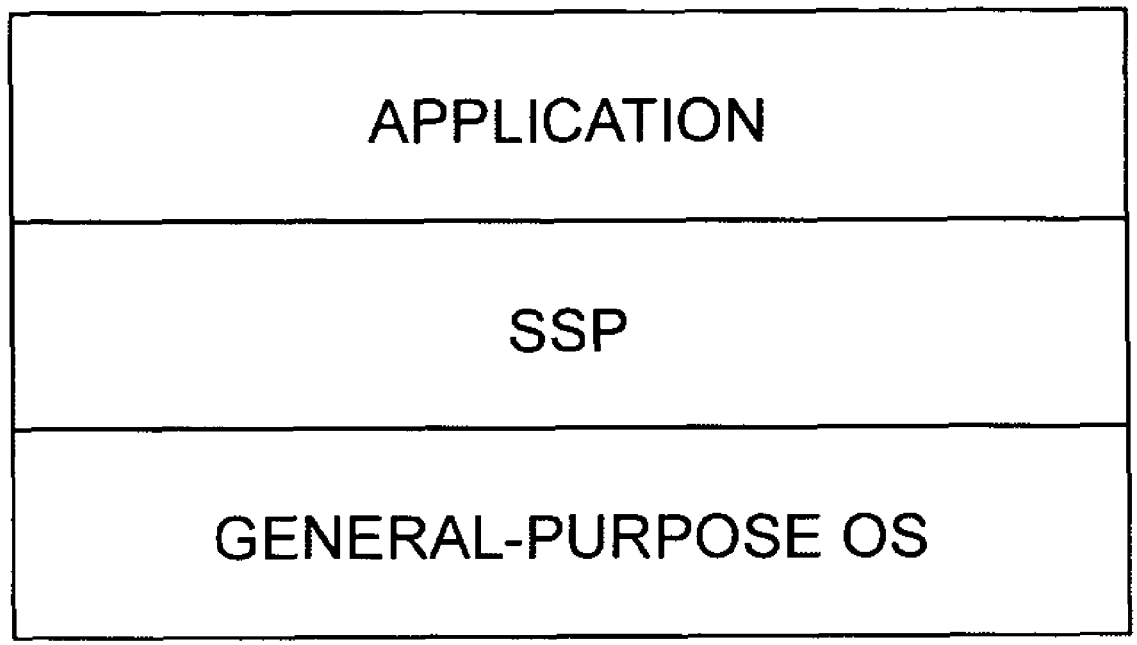
FIG. 2 illustrates the signal processing apparatus in accordance with the embodiment of the present invention.

As shown in FIG. 2, the SSP is arranged between an general-purpose operating system (OS) and an application software program. The application software program easily performs a sophisticated signal processing function using the SSP. The SSP, in need of no graphical user interface (GUI), is used as a signal processing engine for an add-on device having no display.

The SSP of the signal processing apparatus in accordance with one embodiment of the present invention is a middleware having a graph structure. The SSP is basically constructed of a single computer, and may be constructed of a plurality of computers linked via a network.

The signal processing apparatus as the SSP in accordance with the embodiment of the present invention includes two major elements, including a graph module (hereinafter simply referred to as a graph) implemented in software, and a plugin module (hereinafter simply referred to as a plugin) implemented in software.

The plugin is a signal processing module (software) for performing a signal processing unit, such as filtering, equalizing, gain controlling.

The plugin may include a plurality of input ports and a plurality of output ports. The plugin performs a signal process unique thereto on an audio signal input through an input port, and outputs the processed audio signal from the output port therefrom.

A plurality of plugins are connected by connecting the output port of a plugin to the input port of another plugin (establishing a virtually connected state rather than establishing a hardware connected state), and a complex signal processing function is thus performed. In the connection of plugins, the output of one plugin is connected to the input of another plugin, but the inputs cannot be connected to each other and, the inputs cannot be connected to each other.

The graph serves as a system of the SSP, includes a plurality of plugins. In response to an operational input from a user, the graph generates or deletes a plugin, and performs port to port connections, and stores resulting circuit arrangement information. The graph constructs any circuit composed of plugins.

When a signal processing function of the graph is called, the graph relays received audio data with time information to plugins, and thus inputs or outputs the audio data and additional information to or from the plugin.

The graph also has the feature of the plugin. The graph has input and output ports as the plugin, and can connect to another plugin. The graph can include a plurality of plugins. By producing a graph, a circuit block (graph) composed of a plurality of plugins is handled as a single plugin. The graph handled as a single plugin serves as a unitary component containing a plurality of circuits.

Figure 3:
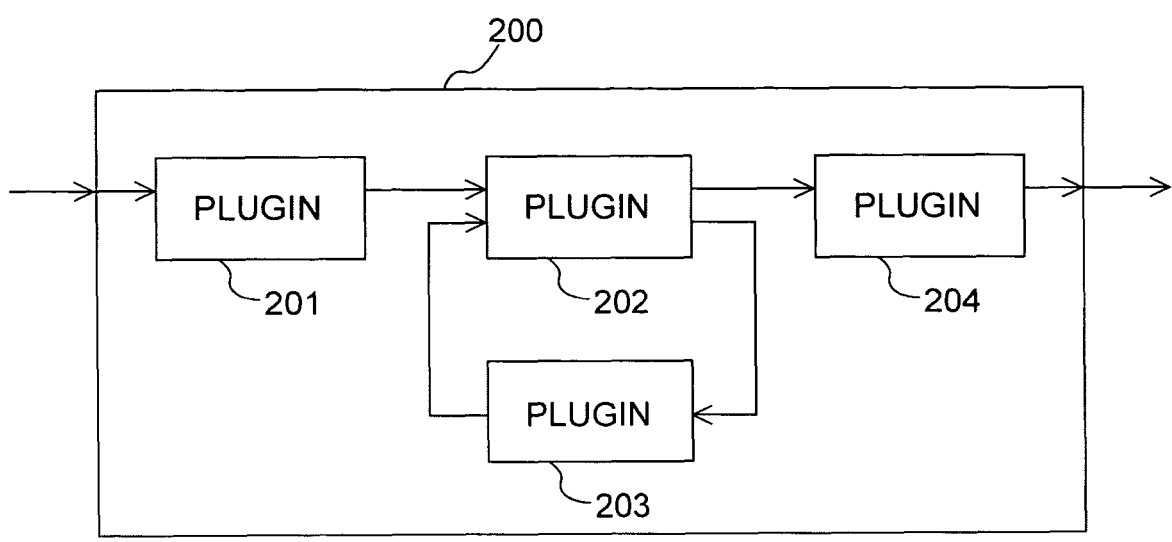
FIG. 3 illustrates the signal processing apparatus in accordance with the embodiment of the present invention.

FIG. 3 illustrates a graph containing a plurality of plugins therewithin. The signal processing apparatus of the embodiment of the present invention is implemented by a personal computer. In response to a user command, the personal computer graphically displays a graph, plugins, and the connection state of the plugins on a display thereof.

As shown in FIG. 3, the user generates a root graph 200 first, and then generates a circuit composed of a plurality of plugins 201-204. Each of the plugins 201-204 may be selected from plugins stored in the personal computer. The plugins in the stored state thereof are a template in an object-oriented class and an actual object is not generated yet.

For example, the user selects each of the plugins 201-204 from the plugins stored in a memory of the personal computer, and dynamically generates (installs) the plugins 201-204 in the root graph 200. Objects in the object-oriented are now generated. The user then commands the personal computer to connect output ports and input ports of the plugins 201-204 and connects the root graph 200 to each of the plugins 201 and 204. The circuit of FIG. 3 is thus established.

The root graph 200 holds circuit arrangement information of the internal plugins 201-204. When the user calls a signal processing function of the root graph 200, signal processing functions of the contained plugin are recursively called from the signal processing functions of the root graph 200. Calculation process relating to the signal process are successively performed. The transfer of the recursive signal processing function call is the SSP system itself.

Figure 4:
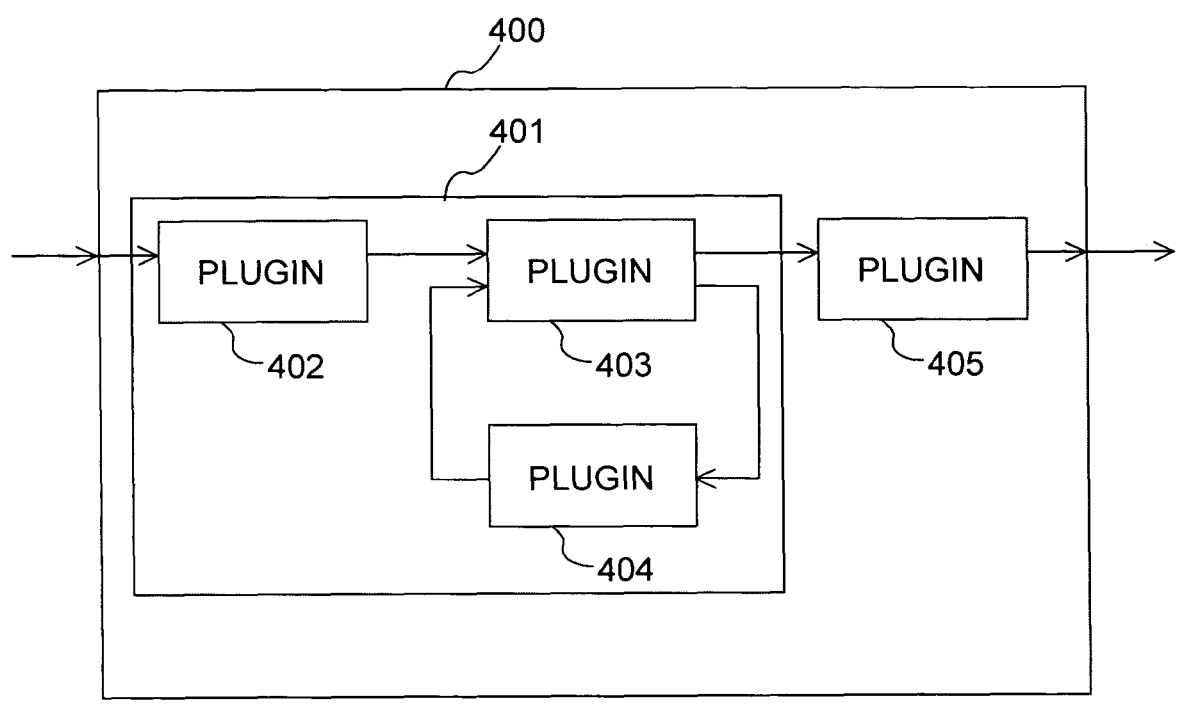
FIG. 4 illustrates the signal processing apparatus in accordance with the embodiment of the present invention.

FIG. 4 illustrates another graph containing a plurality of plugins therewithin. As previously discussed, the graph also functions as a plugin. The graph has a recursive structure containing a plugin other than a graph and the graph (branch graph). Like another plugin, the graph has input and output ports. If viewed from the outside, the graph appears as a box. The graph includes a circuit block composed of a plurality of plugins.

As shown in FIG. 4, a graph 400 is a root graph. The root graph 400 includes a branch graph 401 and a plugin 405. The branch graph 401 includes a plugin 402, a plugin 403, and a plugin 404. The plugin 402, the plugin 403, and the plugin 404 in the branch graph 401 remain invisible from the root graph 400, and the branch graph 401 appears as a single plugin.

The user first generates a root graph (root graph 400) as a root. By calling a plugin generation and deletion function of the root graph 400, the user generates the branch graph 401 and the plugin 405 within the root graph.

By calling the plugin generation and deletion function in the branch graph 401, the user generates the plugin 402, the plugin 403, and the plugin 404.

To perform a signal process, the user calls first a signal processing function of the root graph 400. The signal processing function of the branch graph 401 and the plugin 405, as the contained plugins, are recursively called from the signal processing functions of the root graph 400. The calculation process is successively performed. The graph has the function of determining the sequence of the recursive signal processing function calls.

In the branch graph 401, the signal processing function of the branch graph 401 is called. The signal processing functions of the plugin 402, plugin 403, and plugin 404, to be contained, are recursively called from the signal processing functions of the branch graph 401.

The SSP system is the above-referenced function itself of the graph. The plugin, called the graph, performs the functions of the system including a generation and deletion process of the plugin, a connection process of a plugin to plugin, a relay of data from plugin to plugin, a synchronization establishing process of the plugin between time information and each of audio information and video information, a successive call process of a signal processing function of each plugin, and a determination process of determining the call sequence.

In the following discussion, the term "system" refers to a graph itself or a function of the graph.

Figure 5:
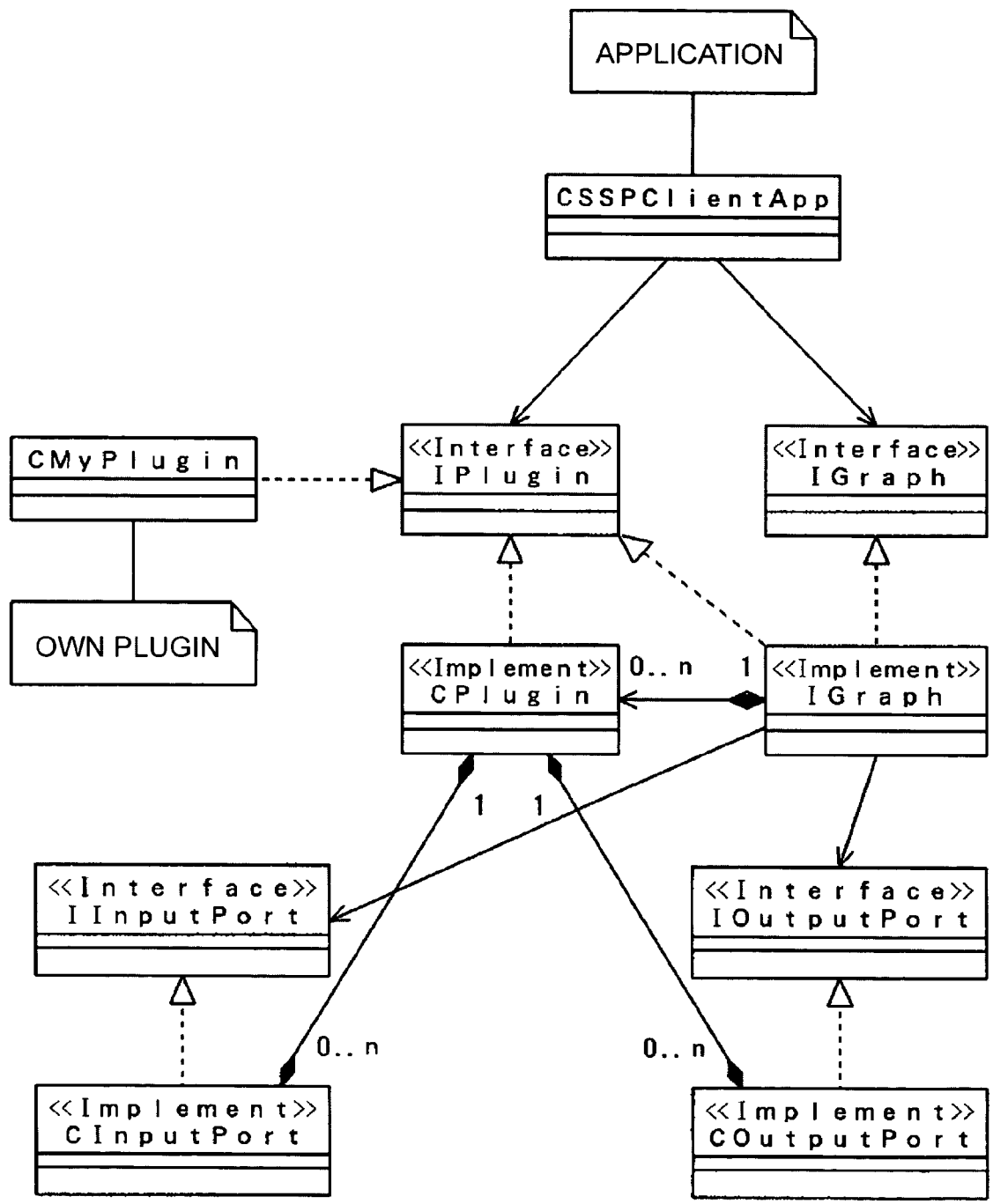
FIG. 5 illustrates the signal processing apparatus in accordance with the embodiment of the present invention.

FIG. 5 is a unified modeling language (UML) of class chart illustrating the entire structure of an SSP middleware as an example. The SSP middleware is represented in an object-oriented language, and a class and an application programming interface (API) are defined.

The plugin class (CPlugin) inherits from a plugin interface (IPlugin), and implements an interface unique to the plugin. The plugin class holds a plurality of input port classes (CInputPort) and a plurality of output port classes (COutputPort).

A plurality of types of plugin classes are available depending on functions. For example, a plugin class for performing an addition is an adder plugin class (Adder Plugin), and a plugin class for performing a multiplication is a multiplier plugin class. These classes are classified as own plugin (CMyPlugin). The own plugin class inherits from the plugin class. The user of the middleware can easily generate own plugin using a plugin template.

Graph class is described below. The graph class (CGraph) includes a plurality of plugin classes. As the plugin class, the graph class inherits from the plugin interface (IPlugin), and the graph class itself is a single plugin class.

The graph class has a recursive layer structure in which one graph contains another graph and plugin therewithin. This structure corresponds to a composite pattern of a "design pattern" as a typical object-oriented design technique.

The graph, also serving as a plugin, has input and output ports, and is interconnected to another plugin. By producing a graph object, a circuit block composed of a plurality of plugin objects is handled as a single component object.

Interface (API) is also defined in both the graph class and the plugin class. An application serving as a client of the SSP middleware can control the object by controlling the API. An operation the user performs on the SSP system means an operation to the two objects.

Figure 6:
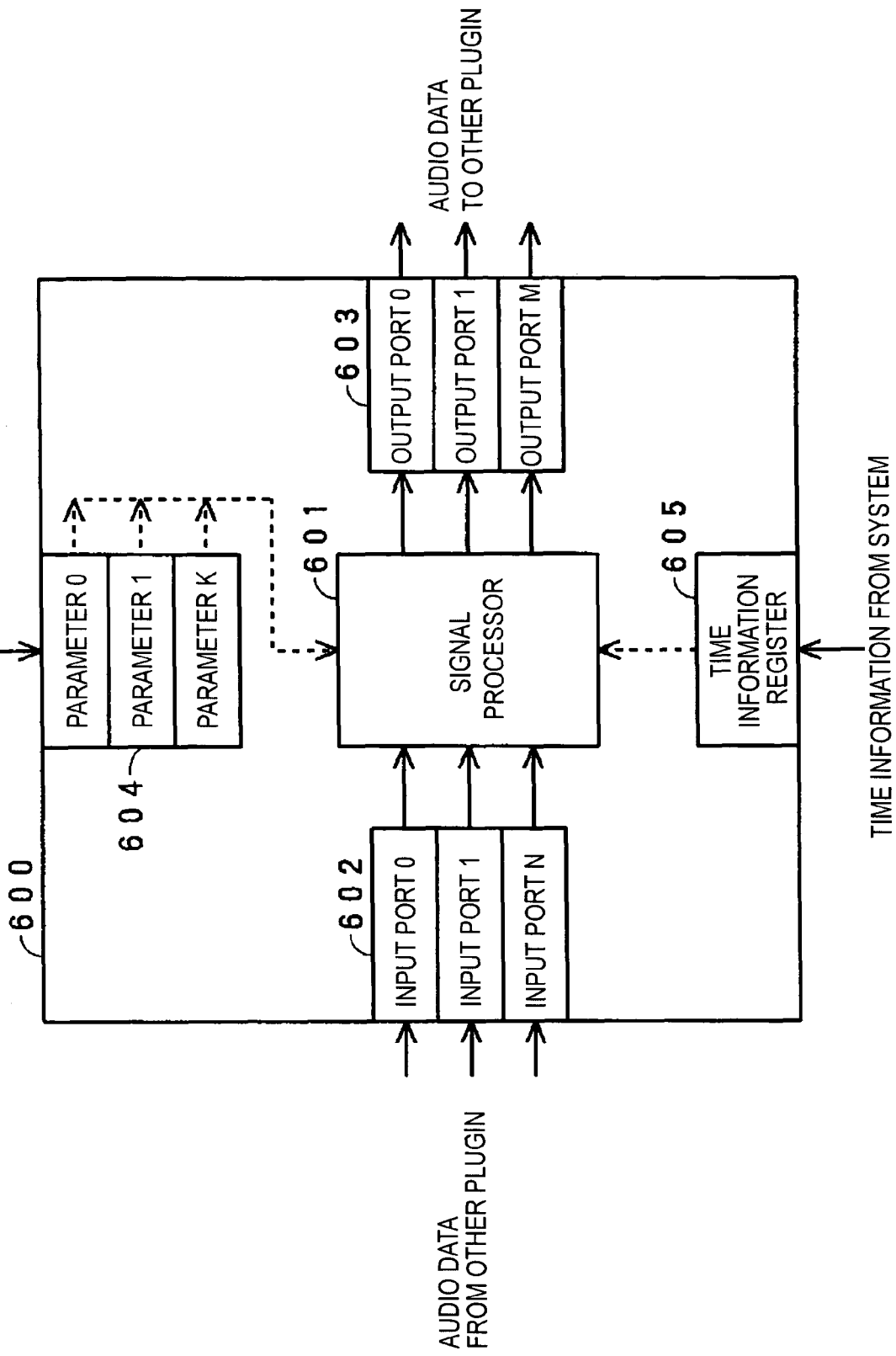
FIG. 6 illustrates the structure of a plugin of the signal processing apparatus in accordance with the embodiment of the present invention.

FIG. 6 illustrates the structure of the plugin. As previously discussed, the plugin is a software signal processing module, and each element of FIG. 6 is implemented in software rather than in hardware.

As shown in FIG. 6, a plugin 600 includes a signal processor 601. Furthermore, the plugin 600 can have zero or more input ports 602 and zero or more output ports 603. The plugin 600 exchanges a signal (audio data in this example) with another plugin via the input port 602 and the output port 603. An audio signal of one channel is input or output on a per port basis.

By commanding the plugin 600 to add or delete the input port 602 and the output port 603 to the plugin 600, the number of input ports 602 and output port 603 of the plugin 600 is dynamically changed even in the middle of signal processing. The input port 602 is numbered in the order of addition with an identification number from 0 to N (N is any natural number) and the output port 603 is numbered in the order of addition with an identification number from 0 to M (M is any natural number). The user can select one of the input ports 602 and one of the output ports 603 by specifying the identification numbers.

The plugin 600 includes zero or more parameter storage units (parameter buffers) 604. The parameter storage unit 604 can have zero or more parameter. The parameter refers to a variable that sets an amount of effect in the signal process, and is input by the user. For example, if the plugin 600 is an amplifier, the parameter is an amplification gain. The user using the plugin 600 can change the effect of the signal process by modifying the parameter value of the plugin 600.

Here in this example, the parameter is numbered with an identification number from 0 to K (K is any natural number). By specifying any identification number, the user can modify the content of the parameter buffer at any timing. The parameter input by the user is temporarily stored in the parameter storage unit 604 in the plugin 600. The parameter is read from the parameter buffer 604 based on information synchronized with sample data given to the system (graph), and is then transferred to the signal processor 601. The signal processor 601 uses the parameter in the signal process thereof.

The plugin 600 includes a time information register 605. The time information register 605 continuously receives time information from the SSP system (graph). The time information is a cumulative count of audio input and output samples from the start point of the SSP system (at the beginning of the signal processing function of the graph). The cumulative count is the most basic time information of the SSP system.

In the SSP system of the embodiment of the present invention, the time information is completely synchronized with the audio input and output data. More specifically, the SSP system concurrently supplies the plugin 600 with the audio data and the time information. The time information serves as a time stamp of the data sample of the audio data supplied to the plugin 600. The plugin 600 can learn detailed time information concerning as to the sequence of a sample at absolute time of target input data to be processed. Since all plugins present in the SSP system are referenced to and synchronized with the absolute time, the synchronized signal process at a sample accuracy level is performed as the entire circuit in the SSP system.

The plugin 600 includes the signal processor 601. The audio data input from another plugin is transferred to the signal processor 601 via the input port 602. The signal processor 601 performs a signal process unique to the plugin onto the audio data input via the input port 602 while referencing the time information and the parameter value sent to the signal processor 601. The audio data processed by the signal processor 601 is transmitted to another plugin via the output port 603.

In synchronization with the time information, the signal processor 601 performs the process not only by sample unit but also by packet unit, the packet unit composed of a plurality of sample units. In the plugin, the signal processing function is called on a per process unit basis. When the signal process is performed by packet unit, the call of the signal processing function is performed once per packet. The signal processing speed is increased more as the number of function calls becomes smaller.

When the video data is processed together with the audio data in this embodiment, the processing of the audio data is synchronized with a video frame of the audio data (in audio-video (AV) synchronization). The audio-video synchronization process will be described later. If the processing of the audio data is synchronized with the video frame of the video data, vertical synchronization information Vs of the video data is supplied from the system to the plugin 600 together with the time information.

The plugin 600 checks the vertical synchronization signal Vs synchronized with the time information from the system. If the plugin 600 determines that it is the timing of the vertical synchronization signal Vs, the plugin 600 performs processes to be performed with video synchronized with audio, including an update process of a parameter to be sent to from the parameter buffer 604 to the signal processor 601 at the timing of the vertical synchronization signal Vs. In this way, all parameters in all plugins in the circuit arranged in the graph are updated in synchronization with the vertical synchronization signal Vs, and the AV synchronization is thus performed.

Figure 7:
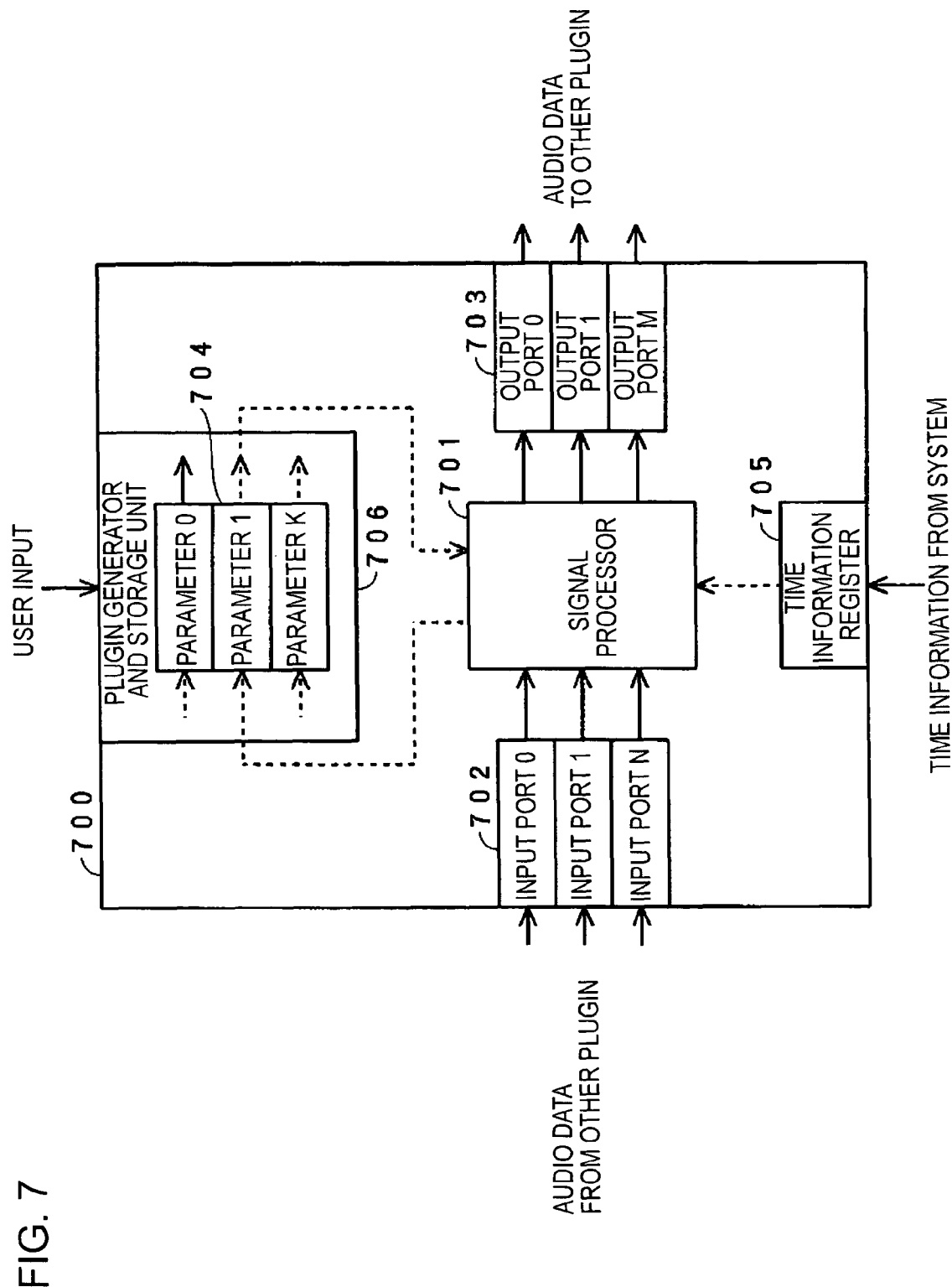
FIG. 7 illustrates the structure of a graph of the signal processing apparatus in accordance with the embodiment of the present invention.

FIG. 7 illustrates a graph. As previously discussed, the graph is a software processing module. Elements in the graph 700 of FIG. 7 are implemented in software rather than in hardware.

The graph 700 has the feature of the plugin as previously discussed. The graph 700 includes a signal processor 701, an input port 702, an output port 703, a parameter buffer 704, and a time information register 705. The signal processor 701 reads plugins contained in the graph 700. The functions of the input port 702, the output port 703, the parameter buffer 704, and the time information register 705 are identical to the counterparts of the plugin 600 discussed with reference to FIG. 6, and are not discussed here. The parameter of the parameter buffer 704 is the one for the graph 700.

The functions unique to the graph 700 are described below.

The graph 700 includes a plugin generator and storage unit 706. The graph 700 can contain zero or more plugins. By commanding the graph 700 to add or delete plugins, the user dynamically generates or deletes plugins even in the middle of signal processing. The dynamic generation and deletion of the plugin during signal processing will be discussed in detail later.

In the graph 700, added plugins are numbered in the order of addition with identification numbers 0-J (J is an integer number). The user identifies each plugin by the identification number. The graph 700 not necessarily stores the plugins in the plugin generator and storage unit 706 in the order of the identification numbers. The plugins in the graph 700 are stored in the plugin generator and storage unit 706 in a state thereof sorted according to the sequence of sequential computation to be discussed later.

The user can command the graph 700 to connect one plugin to another within the graph 700. Even in the middle of signal processing, the user can dynamically modify the connection state of the output port of one plugin to the input port of another plugin. The user can modify the connection state by specifying the identification number of a plugin and the identification number of a port to the graph 700. In response to the connection update request from the user, the graph 700 updates the connection state of the plugins.

The user commands the graph 700 to start the signal process. When the user calls the signal processing function of the graph 700, the signal processing functions of the plugins contained in the graph 700, from among the signal processing functions of the graph 700, are recursively called. The signal processor of the graph or the plugin in the graph 700, stored in the plugin generator and storage unit 706 in the state thereof sorted in the sequence of the sequential computation, performs computation process in accordance with the sequence. The computation process of the graph and the plugin contained in the graph 700 is sequentially performed, and a complex signal process of an entire circuit established in the graph 700 is thus performed. The sequence of the sequential computation is determined by the system (graph 700) in accordance with the connection structure between the plugins.

If the updating of the circuit arrangement, such as the addition and deletion of the plugin and the updating of the connection state of the input port and the output port is performed in response to the user command, the graph 700 performs a path search as will be discussed later. The graph 700 automatically determines an optimum sequence of the sequential computation of the plugin and the graph contained therewithin. A branch graph automatically determines, in the path search thereof, the optimum sequence of the sequential computation of a plugin contained in the branch graph.

As a result of the path search performed by the graph, a group of plugins (including a branch graph as a plugin) are stored in the plugin generator and storage unit 706 in the state sorted according to the optimum sequence of the sequential computation. An algorithm of the path search of the graph will be discussed later.

Figure 1:
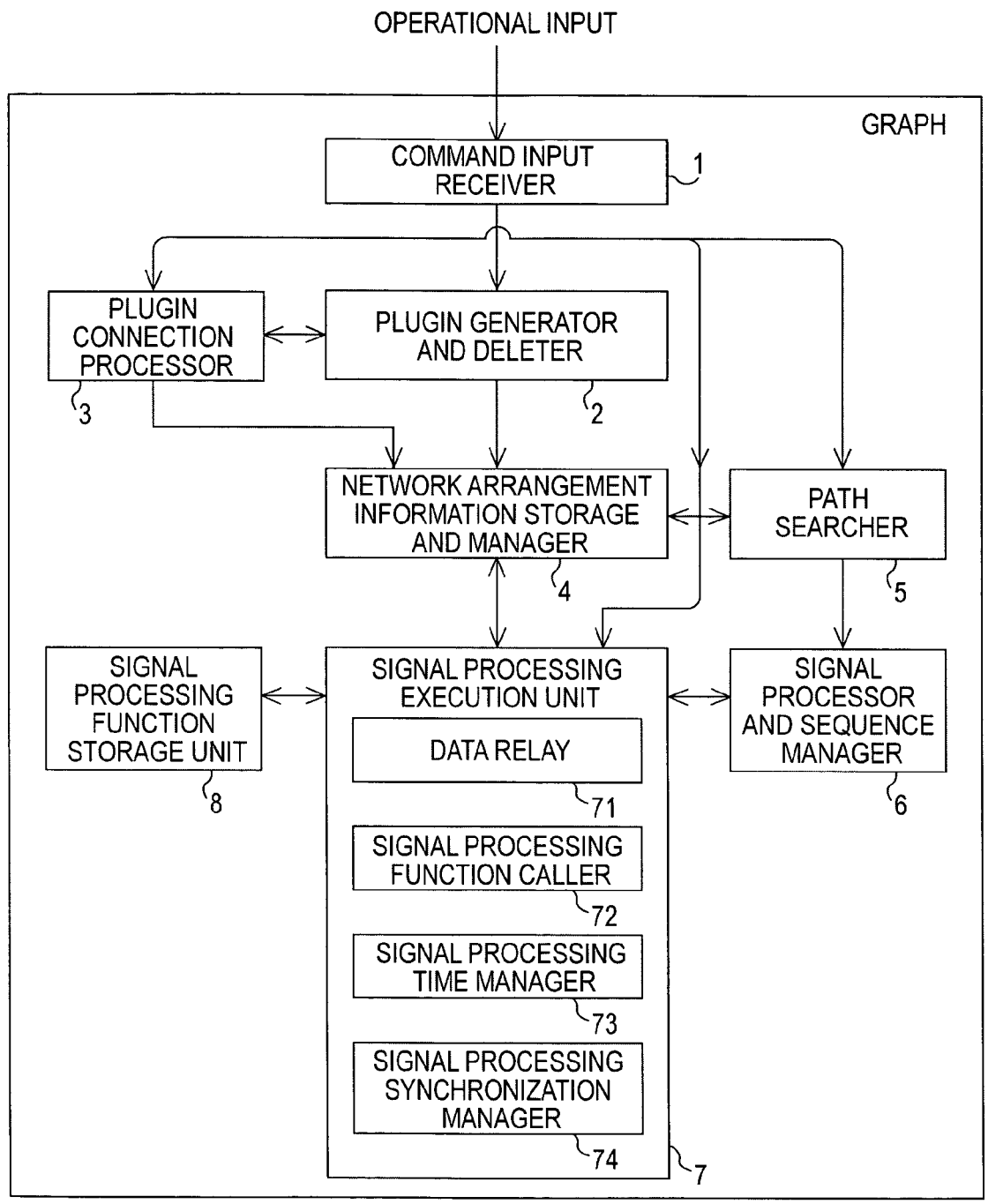
FIG. 1 is a functional block diagram illustrating a major portion of a signal processing apparatus in accordance with one embodiment of the present invention.

FIG. 1 is a functional block diagram of the graph illustrating the functions of the graph. The graph includes a plugin generator and deleter 2, a plugin connection processor 3, a circuit arrangement information storage and manager 4, a path searcher 5, a signal processor and sequence manager 6, a signal processing execution unit 7, and a signal processing function storage unit 8.

Upon receiving, from the user, the plugin generation and deletion command, the input and output port connection command, and the parameter input command, the command input receiver 1 relays the plugin generation and deletion command to the plugin generator and deleter 2, and the input and output port connection command to the plugin connection processor 3. In response to the plugin generation and detection command, and the input and output port connection command, the command input receiver 1 activates the path searcher 5 to perform the path search. Upon receiving the parameter input command, the command input receiver 1 stores the parameter input to the parameter buffer thereof.

In response to the plugin generation and deletion command from the command input receiver 1, the plugin generator and deleter 2 generates or deletes a plugin. When a plugin is generated, the plugin generator and deleter 2 tags the generated plugin with an identification number and transfers plugin generation information containing the identification number to the circuit arrangement information storage and manager 4. During the plugin deletion, the plugin generator and deleter 2 transfers deletion information containing the identification number of a deleted plugin, and a deletion request to that plugin to the circuit arrangement information storage and manager 4.

Upon receiving the plugin connection command from the command input receiver 1, the plugin connection processor 3 transfers, to the circuit arrangement information storage and manager 4, connection information concerning the output port and the input port of a plugin specified by the connection command.

The circuit arrangement information storage and manager 4 stores and manages information of a circuit established in the graph, based on the generation information, the deletion information, and the connection information, from the plugin generator and deleter 2 and the plugin connection processor 3.

Upon receiving an activation request responsive to the plugin generation and deletion command or the input and output port connection command, from the command input receiver 1, the path searcher 5 activates and executes an algorithm of the path search to be discussed later. Information concerning the sequence of the sequential computation (signal processing sequence) of the plugins, determined as a result of execution of the path search algorithm, is then transferred to the signal processor and sequence manager 6. As previously discussed, the signal processor and sequence manager 6 stores, in the plugin generator and storage unit 706, the identification information of the plugins arranged in the signal processing sequence as previously discussed.

The signal processing execution unit 7 includes a data relay 71, a signal processing function caller 72, a signal processing time manager 73, and a signal processing synchronization manager 74 as shown in FIG. 1.

The signal processing execution unit 7 starts the signal process with the circuit established in the graph in accordance with a signal processing start command input via the command input receiver 1. When the user issues a call of the signal processing function of the graph 700, the signal processing function caller 72 reads the signal processing function of the graph issued from the signal processing function storage unit 8. In response to the user command, the signal processing function caller 72 recursively reads the signal processing functions of the plugins in the graph in the sequence of the signal processing functions within the graph.

The data relay 71 in the signal processing execution unit 7 references circuit information stored in the circuit arrangement information storage and manager 4, and transfers the audio data, in this case, to the plugins in accordance with the circuit arrangement.

The signal processing time manager 73 manages time of data sample unit from the data relay 71. The signal processing synchronization manager 74 manages a packet synchronization process at the signal processing of a packet unit (such as management of the front of a packet) and AV synchronization for synchronizing the processing timing of the audio data with the video data frame.

The path searcher 5 receives an update request to update the circuit arrangement in the graph from the command input receiver 1 even in the middle of the signal processing of the signal processing execution unit 7. In accordance with the updated circuit arrangement, the path searcher 5 performs a path search, and sends search results to each of the circuit arrangement information storage and manager 4 and the signal processor and sequence manager 6. The signal processing execution unit 7 performs the signal process in the updated circuit arrangement in accordance with the signal processing sequence based on the updated path search results.

Figure 8:
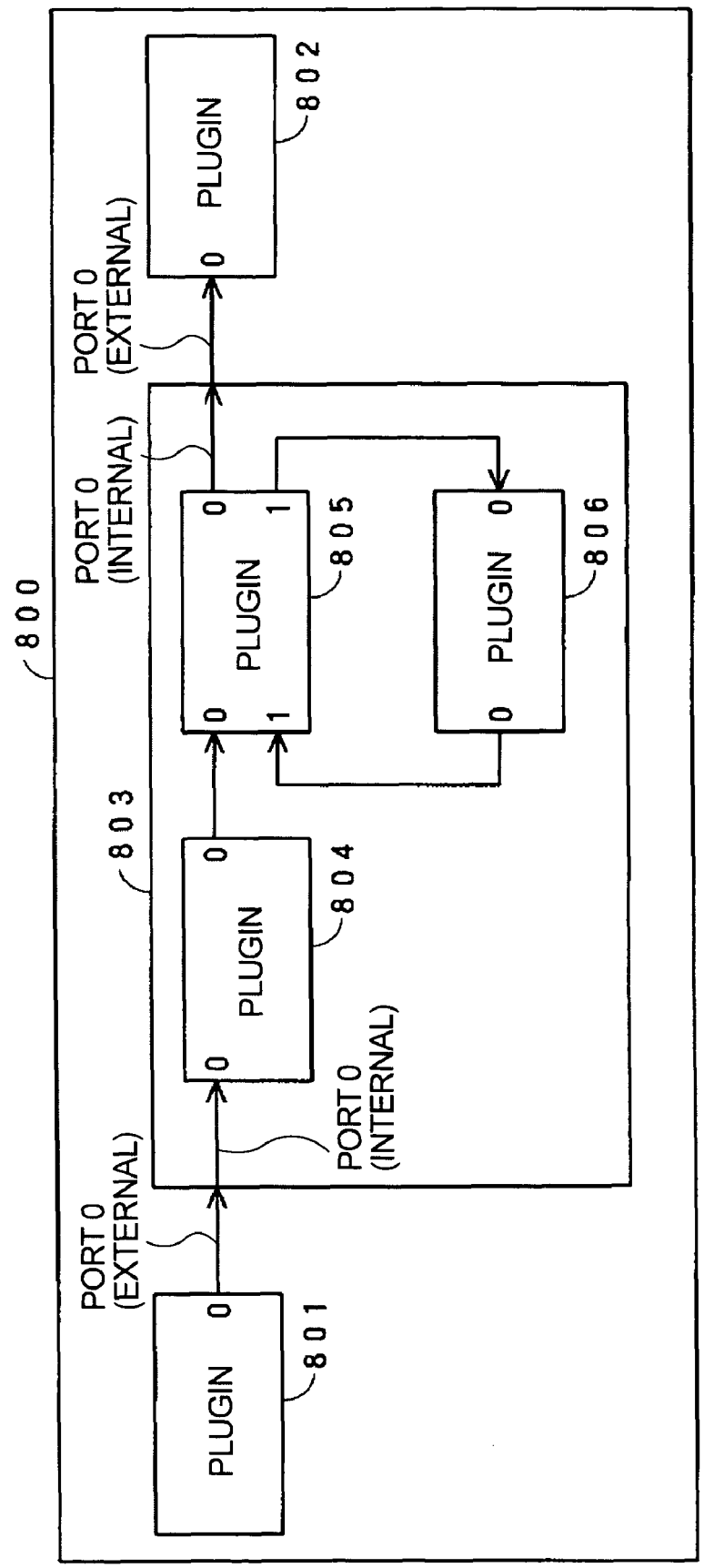
FIG. 8 illustrates the structure of a circuit arrangement of the signal processing apparatus in accordance with the embodiment of the present invention.
Figure 9:
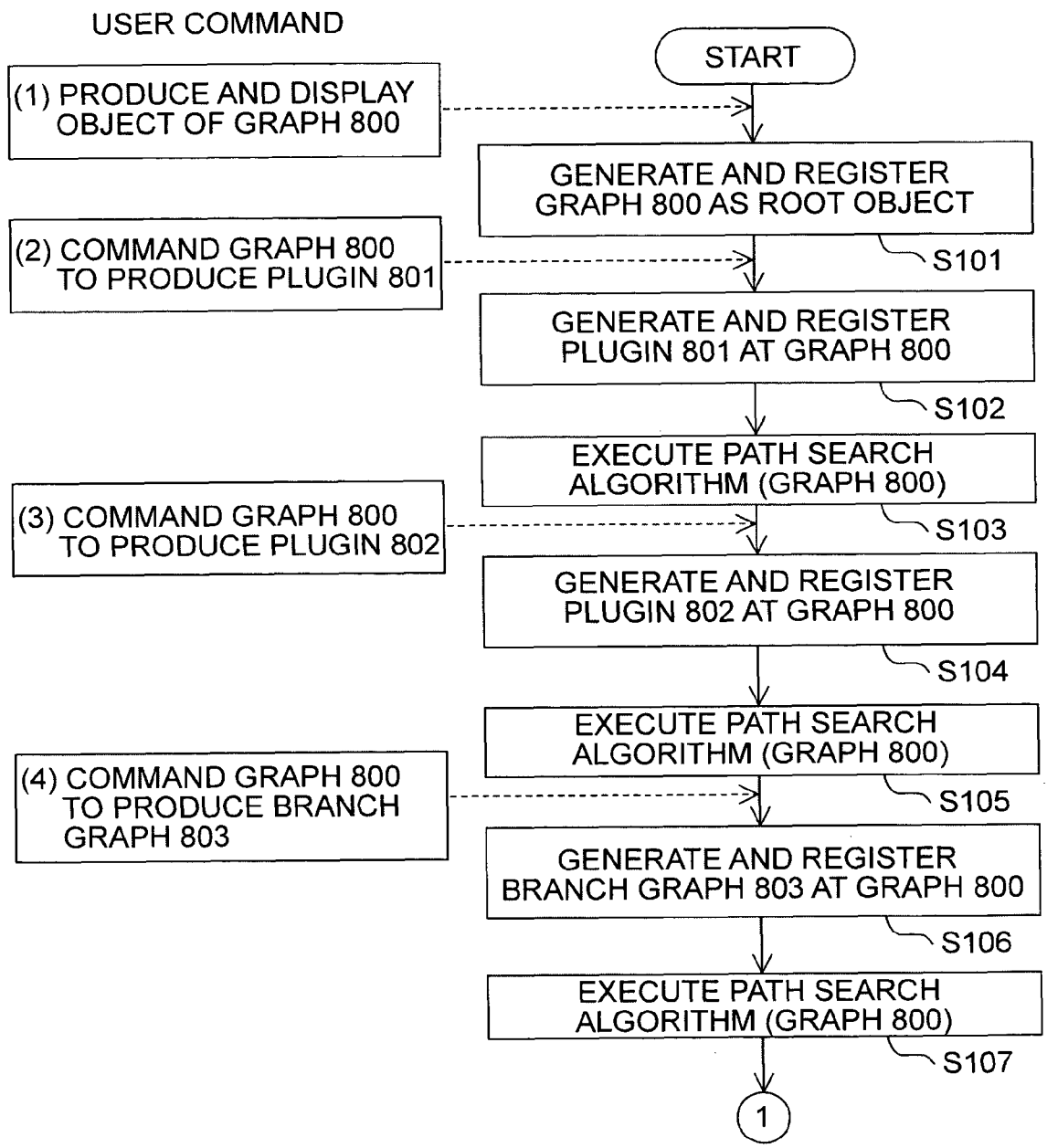
FIG. 9 illustrates the structure of a circuit arrangement procedure of the signal processing apparatus in accordance with the embodiment of the present invention.
Figure 10:
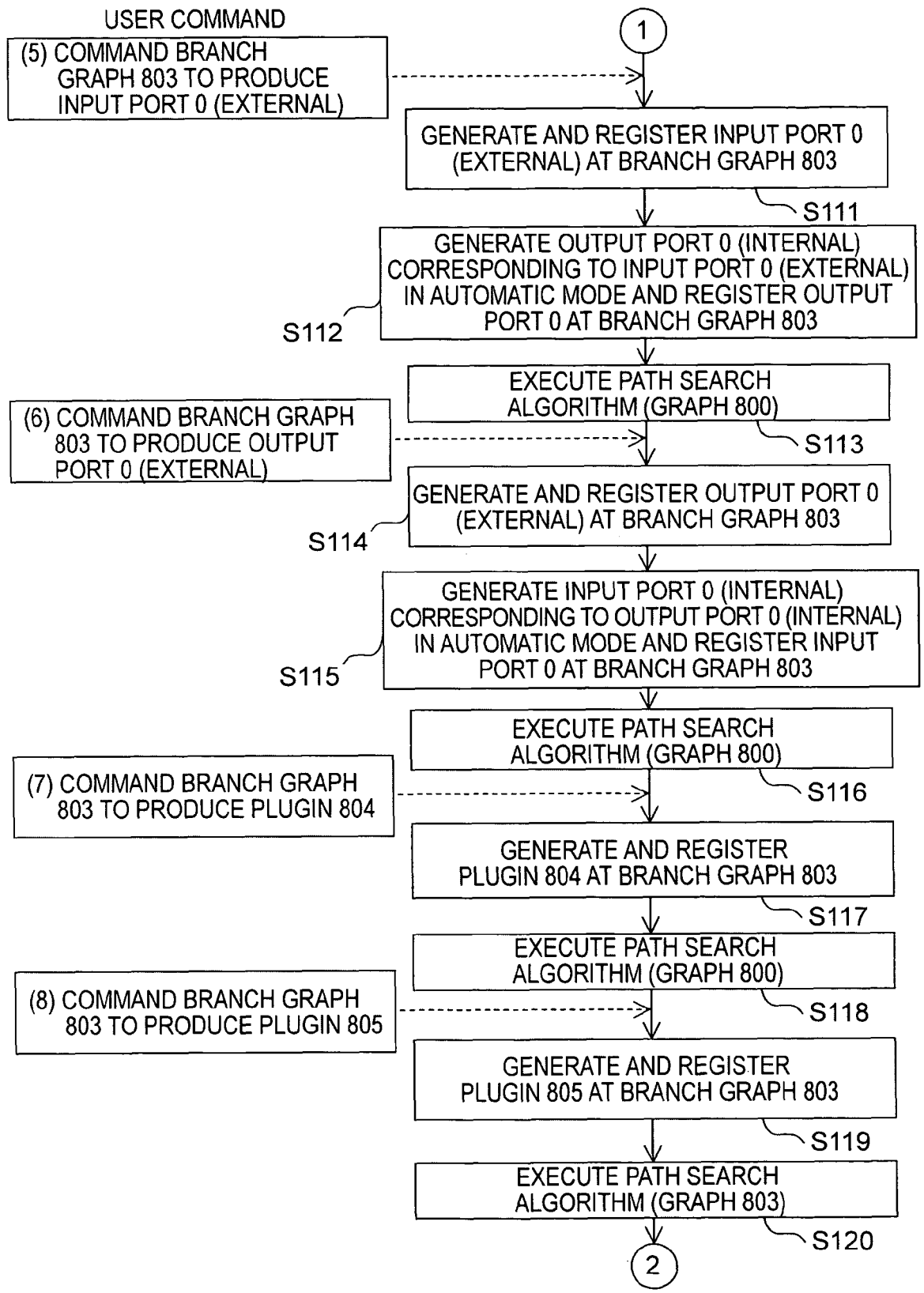
FIG. 10 illustrates the structure of the circuit arrangement procedure of the signal processing apparatus in accordance with the embodiment of the present invention.
Figure 11:
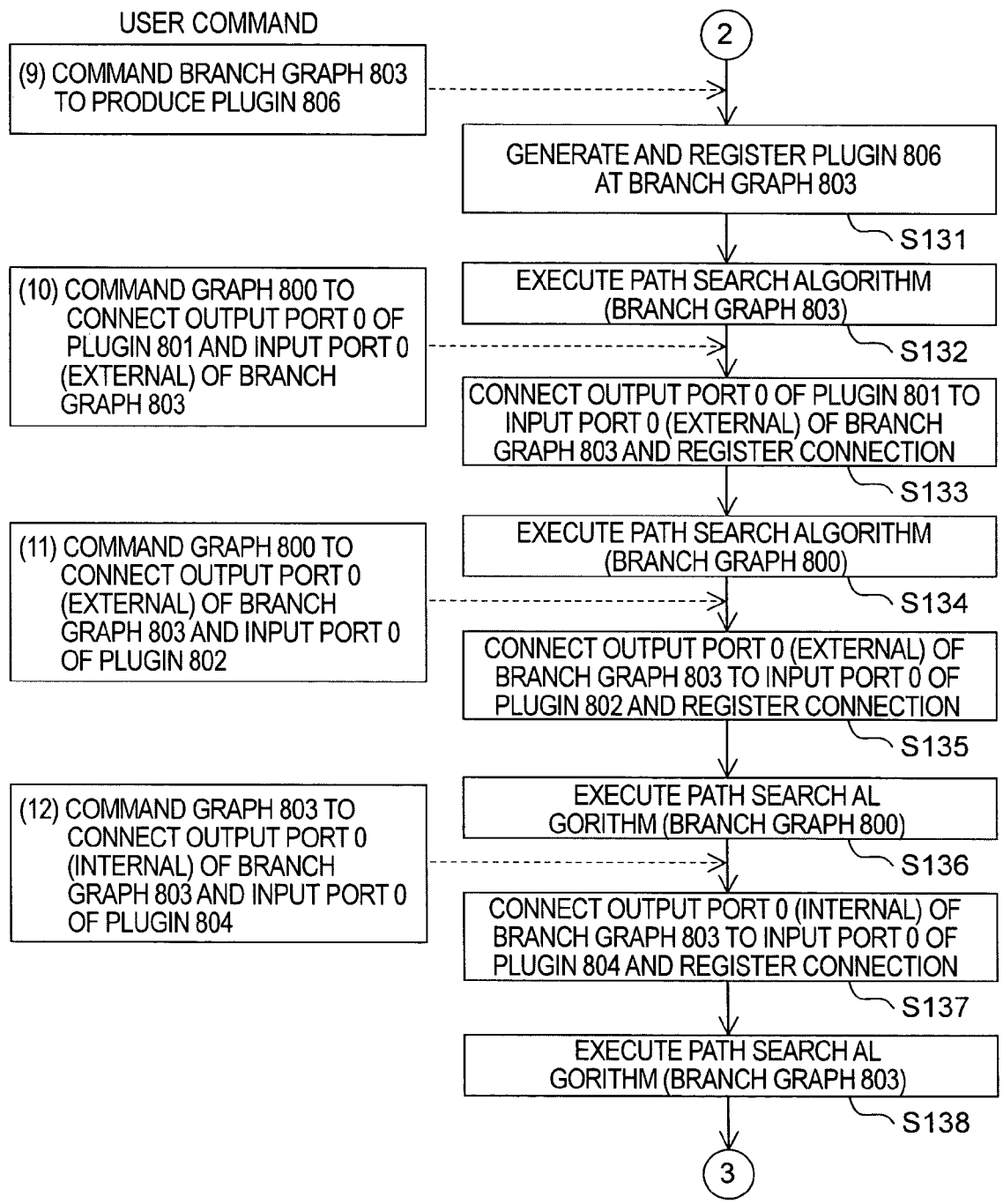
FIG. 11 illustrates the structure of the circuit arrangement procedure of the signal processing apparatus in accordance with the embodiment of the present invention.
Figure 12:
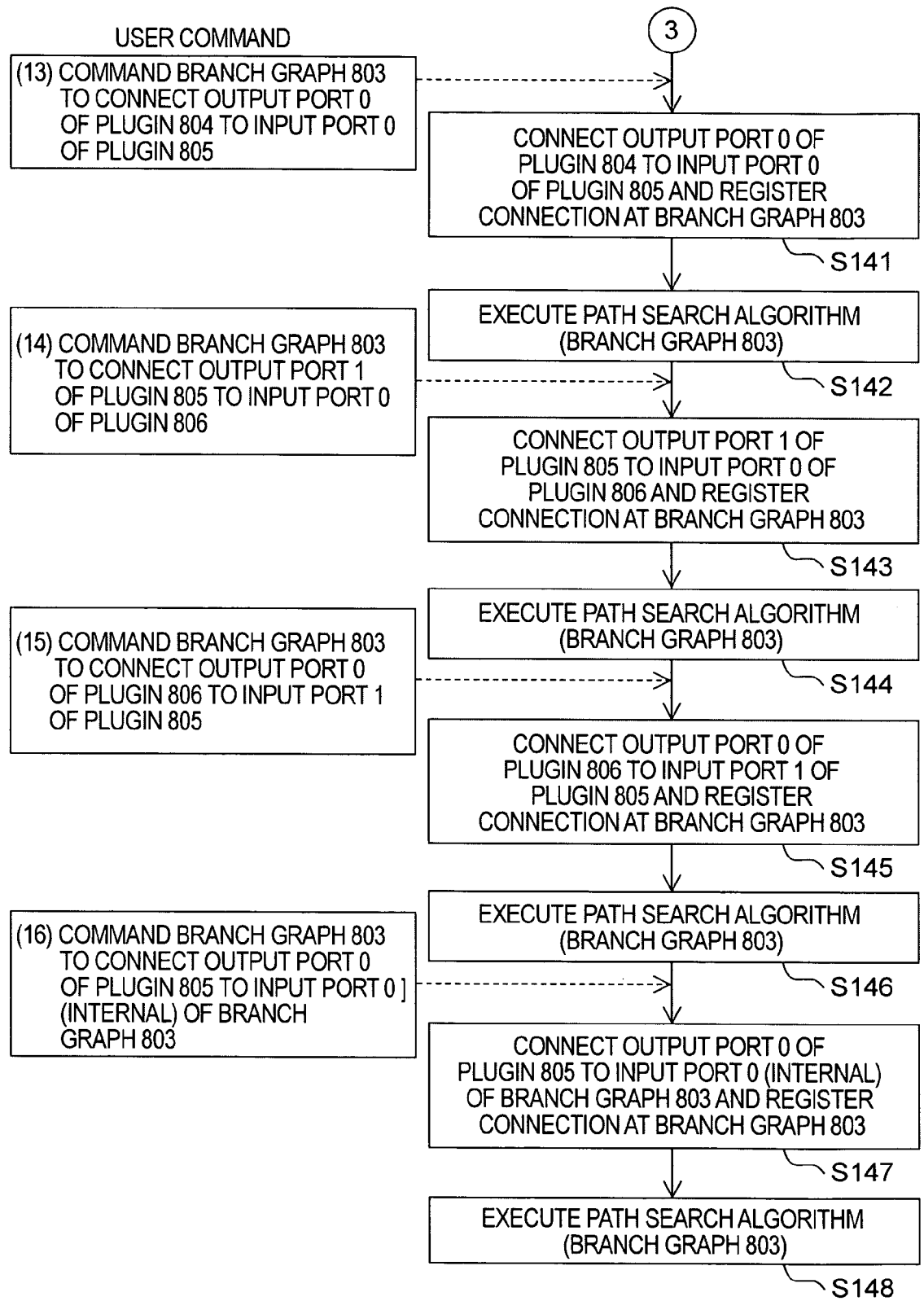
FIG. 12 illustrates the structure of the circuit arrangement procedure of the signal processing apparatus in accordance with the embodiment of the present invention.

The flow of a generation process of a signal processing circuit in accordance with one embodiment of the present invention is discussed with reference to FIG. 8. As shown in FIG. 8, the signal processing circuit is formed in the graph. In the discussion that follows, each of the graph and the plugin are referred to as an object. The object thus refers to an object-oriented instance, and a graph or plugin itself.

Default number of input and output ports of the graphs and plugins during the object generation is listed below. The user is enabled to add or delete an input port and/or an output port subsequent to the object generation.

Root graph 800: 0 input port, and 0 output port
Plugin 801: 0 input port, and 1 output port
Plugin 802: 1 input port, and 0 output port
Plugin 803: 1 input port, and 1 output port
Plugin 804: 1 input port, and 1 output port
Plugin 805: 2 input ports, and 2 output ports
Plugin 806: 1 input port, and 1 output port In the discussion that follows, a number following the input port and the output port is a port number of the corresponding port, and could be one of 0, 1, and 2.

The generation procedure of the circuit of signal processing function storage unit 8 is described below with reference to flowcharts of FIGS. 9-12. To simplify explanation, user commands and process steps of the signal processing apparatus are shown to correspond to each other. The signal processing apparatus displays, on a display, a screen corresponding to the user command input, and the user enter an operational input while viewing the display screen.

The user issues a command to generate an object as a graph (root graph) 800 (user command (1)). The signal processing apparatus generates and registers the root graph 800 (step S101).

The user commands the object as the graph 800 to generate an object as a plugin 801 (user command (2)). The signal processing apparatus generates the plugin 801 in the graph 800 with the plugin generation and deletion function of the generated graph 800 (step S102). The path searcher 5 in the graph 800 executes a path search in response to the plugin generation command (step S103).

The user commands the object as the graph 800 to generate an object of a plugin 802 (user command (3)). The signal processing apparatus generates and registers the plugin 802 in the graph 800 using the plugin generation and deletion function of the graph 800 (step S104). The path searcher 5 in the graph 800 executes a path search in response to the plugin generation command (step S105).

The user commands the object as the graph 800 to generate an object of a graph (branch graph) 803 (user command (4)). The graph 800 generates and registers the branch graph 803 therewithin using the plugin generation and delection function thereof (step S106). The path searcher 5 in the graph 800 performs a path search in response to the plugin generation command (step S107).

The user commands the object as the graph 803 to generate an input port 0 (external) (user command (5)). In response, the signal processing apparatus generates and registers the input port 0 (external), as a function of the generated branch graph 803, in the branch graph 803 (step S111). In the branch graph 803, an output port 0 (internal) corresponding to the input port 0 (external) is automatically generated (step S112). The path searcher 5 in the graph 803 executes a path search in response to the port generation command (step S113).

The user commands the object as the graph 803 to generate an output port 0 (external) (user command (6)). In response, the signal processing apparatus generates and registers, as a function of the generated branch graph 803, an output port 0 (external), in the branch graph 803 (step S114). In the branch graph 803, an internal input port 0 (internal) corresponding to the output port (external) is automatically generated (step S115). The path searcher 5 in the branch graph 803 performs a path search in response to the port generation command (step S116).

The user commands the object as the branch graph 803 to generates an object as a plugin 804 (user command (7)). The branch graph 803 then generates and registers the plugin 804 in the branch graph 803 using the plugin generation and deletion function thereof (step S117). The path searcher 5 in the branch graph 803 performs a path search in response to the plugin generation command (step S118).

The user commands the object as the branch graph 803 to generate an object as a plugin 805 (user command (8)). The branch graph 803 generates and registers the plugin 805 in the branch graph 803 using the plugin generation and deletion function thereof (step S119). The path searcher 5 in the branch graph 803 performs a path search in response to the plugin generation command (step S120).

The user commands the object as the branch graph 803 to generate an object as a plugin 806 (user command (9)). The branch graph 803 generates and registers the plugin 806 in the branch graph 803 using the plugin generation and deletion function thereof (step S131). The path searcher 5 in the branch graph 803 performs a path search in response to the plugin generation command (step S132).

The user commands the object as the graph 800 to connect the output port of the plugin 801 to the input port 0 (external)

of the branch graph 803 (user command (10)). The plugin connection processor 3 in the graph 800 connects the output port 0 of the plugin 801 to the input port 0 (external) of the branch graph 803, and registers the connection (step S133). The path searcher 5 in the graph 800 performs a path search in response to the port connection command (step S134).

The user commands the object as the graph 800 to connect the output port 0 (external) of the branch graph 803 to the input port 0 of the plugin 802 (user command (11)). The plugin connection processor 3 in the graph 800 connects the output port 0 (external) of the branch graph 803 to the input port 0 of the plugin 802 and registers the connection in the graph 800 (step S135). The path searcher 5 in the graph 800 performs a path search in response to the port connection command (step S136).

The user commands the object as the branch graph 803 to connect the output port 0 (internal) of the branch graph 803 to the input port 0 of the plugin 804 (user command (12)). The plugin connection processor 3 in the branch graph 803 connects the output port 0 (internal) of the branch graph 803 to the input port 0 of the plugin 804 and registers the connection in the branch graph 803 (step S137). The path searcher 5 in the branch graph 803 performs a path search in response to the port connection command (step S138).

The user command the object as the branch graph 803 to connect the output port 0 of the plugin 804 to the input port 0 of the plugin 805 (user command (13)). The plugin connection processor 3 in the branch graph 803 connects the output port 0 of the plugin 804 to the input port 0 of the plugin 805 and registers the connection in the branch graph 803 (step S141). The path searcher 5 in the branch graph 803 performs a path search in response to the port connection command (step S142).

The user commands the object as the branch graph 803 to connect the output port 1 of the plugin 805 to the input port 0 of the plugin 806 (user command (14)). The plugin connection processor 3 in the branch graph 803 connects the output port of the plugin 805 to the input port 0 of the plugin 806 and registers the connection in the branch graph 803 (step S143). The path searcher 5 in the branch graph 803 performs a path search in response to the port connection command (step S144).

The user commands the object as the branch graph 803 to connect the output port 0 of the plugin 806 to the input port 1 of the plugin 805 (user command (15)). The plugin connection processor 3 in the branch graph 803 connects the output port 0 of the plugin 806 to the input port 1 of the plugin 805 and registers the connection in the branch graph 803 (step S145). The path searcher 5 in the branch graph 803 performs a path search in response to the port connection command (step S146).

The user commands the object as the branch graph 803 to connect the output port 0 of the plugin 805 to the input port 0 (internal) of the plugin 803 (user command (16)). The plugin connection processor 3 in the branch graph 803 connects the output port 0 of the plugin 803 to the input port 0 of the plugin 803 and registers the connection in the branch graph 803 (step S147). The path searcher 5 in the branch graph 803 performs a path search in response to the port connection command (step S148).

The circuit of FIG. 8 is thus generated in the graph 800 through the above procedure. When the user commands the graph 800 to start the signal process, the signal processes are sequentially performed by the plugins in accordance with the signal processing sequence determined by the path search.

The signal processing apparatus of the present embodiment performs a total of 16 user commands on the graph object. The graph structure changes each time the procedure responsive to each user command is performed. The system (graph) automatically performs the path search algorithm at each procedure. When the generation process of the circuit arrangement is complete, the path search is also complete, and the signal processing sequence is determined.

The flow of the signal process execution of the circuit formed as shown in FIG. 8 is described below.

The plugin generator and storage unit in the graph 800 stores the plugins in the state thereof sorted in the optimum sequence of the sequential computation in accordance with the path search algorithm. As shown in FIG. 8, the flow of the signal process execution is discussed on the assumption that the plugins are already stored in the optimum sequence.

(1) The user commands the graph 800 to start the signal process.

(2) The graph 800 starts the signal processing function thereof.

(3) The signal processing function of the plugin 801 from among the signal processing functions of the graph 800 is performed.

(4) The signal processing function of the branch graph 803 from among the signal processing functions of the graph 800 is performed.

(4-1) The signal processing function of the plugin 806 from among the signal processing functions of the branch graph 803 is performed.

(4-2) The signal processing function of the plugin 804 from among the signal processing functions of the branch graph 803 is performed.

(4-3) The signal processing function of the plugin 805 from among the signal processing functions of the branch graph 803 is performed.

(5) The signal processing function of the plugin 802 from among the signal processing functions of the graph 800 is performed.

In the above procedures, only step (1) of commanding the graph 800 to start the signal process is issued by the user. The other steps (2)-(5) are automatically performed by the graph 800 and the branch graph 803.

The following operations are performed within the signal processing function of each plugin.

(1) Receiving input data from the input port (2) Perfuming a signal process on the input data (3) Outputting the processed data to the output port The path search algorithm as the process function of the graph in accordance with the present embodiment is described below.

The path search algorithm forms a major portion of the system of the present embodiment. The plugins contained in the graph are sorted according to the optimum sequence using the path search algorithm. During the signal process, the signal processing functions unique to the respective plugins are called and executed in the sequence applied in the sorting.

If the signal process is performed by a signal process device, such as a digital signal processor (DSP), a computing circuit such as a arithmetic logical unit (ALU) in the DSP typically performs sequential computation to perform the desired signal process. The sequential process performed by the DSP is also applicable to the computation performed by a central processing unit (CPU) of the middleware of the present embodiment.

More specifically, a given circuit is treated as a signal flow graph in accordance with the present embodiment. The sequence of the sequential computation is searched for in the graph. The sequential computation is performed in the sequence as a result of search. The SSP as the middleware of the present embodiment has a path search algorithm unique thereto.

Using the path search algorithm, any digital circuit arrangement containing a feedback loop can be fully emulated. The SSP thus performs dynamic circuit arrangement updating, which no currently available hardware circuits can perform.

In accordance with the present embodiment, the path search algorithm determines the sequence of the sequential computation as to which plugin to start with in the signal process of the signal processing circuit composed of the plugins connected in a graph. The circuit, established in the graph, as a target of the path search may contain a feedback loop circuit.

The path search algorithm is held by the graph and the plugin generator and storage unit in the graph executes the path search algorithm.

When the user performs an operation on the graph to modify the graph structure, the graph automatically performs a path search and determines a new sequence of the sequential computation. If a plurality of graphs are contained in the graph, any graph to be updated performs the path search independent of the other graph. The path search is very simple and completed within a short period of time.

The path search algorithm of the present embodiment is described in detail below.

In the path search algorithm of the present embodiment, a plugin as an element of the circuit arranged in a graph is treated as a node. The node is an element in the graph theory. In the present embodiment, the circuit is expressed by an arrow-headed directed edge that connects one node to another. An arrow directed to a node is defined as an input to that node, and an arrow leaving from a node is defined as an output from that node. The path search algorithm of the present embodiment scans the nodes connected in a graph, thereby determining signal processing order. The path search algorithm of the present embodiment is also referred to as a node scan algorithm.

The node scan algorithm is composed of an initial path search algorithm (primary node scan algorithm) serving as a base for path searching and a loop search algorithm for performing a search also paying attention to loop information of paths.

Figure 13:
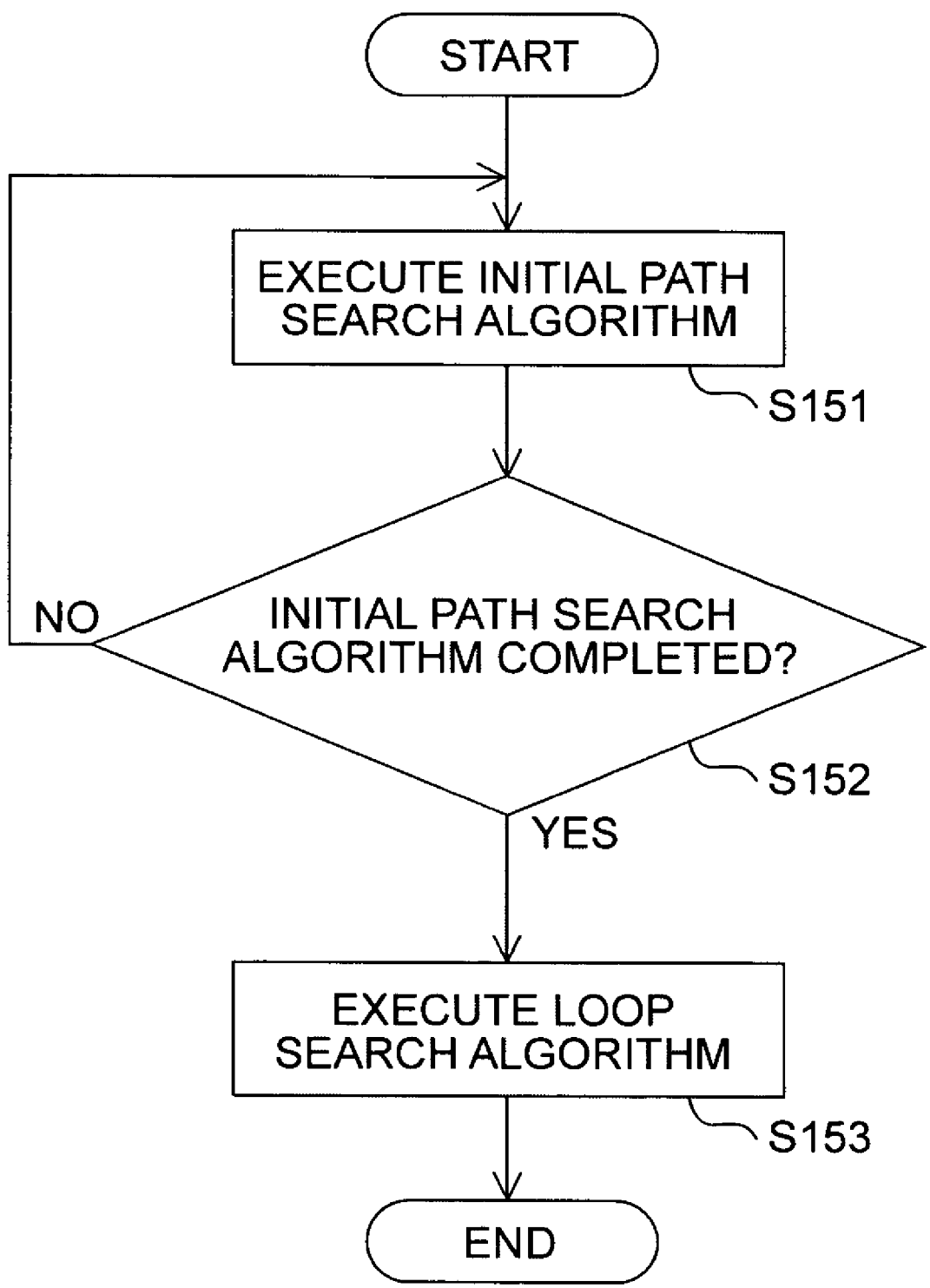
FIG. 13 is a flowchart illustrating a path search algorithm of the signal processing apparatus in accordance with the embodiment of the present invention.

In accordance with the present embodiment as shown in FIG. 13, the initial path search algorithm is performed first in the node scan algorithm (step S151). In succession to the completion of the initial path search algorithm (step S152), the loop search algorithm is performed (step S153).

The initial path search algorithm sets up "propositions to be solved" and solves the propositions under the following "search conditions".

Propositions to be Solved

The nodes arranged in a graph are sequentially scanned. A scan sequence satisfying that all nodes are scanned at a single cycle under the following conditions is desired. It is not necessary that nodes to be scanned are directly connected to each other, and it is perfectly acceptable that the nodes are scanned with some nodes skipped.

Search Conditions (a) Any node having no input thereto is scanned unconditionally.

(b) The node of a plugin serving as a delay element is scanned unconditionally.

(c) Any node scanned is fixed in the output thereof.

(d) If the output of a node B, connected to the input of a node A, is fixed, the input of the node A is fixed.

(e) If all inputs to a node are fixed, that node is scanned.

The nodes are assigned unique numbers in sequence as identifiers. The identification numbers are referred to as node numbers. The node number is not any number but is the number assigned in the sequence of object generation as the plugin. The plugins are divided into a latency type plugin (LTP) and a non-latency type plugin (NLTP). The LTP is a delay element, and causes a delay at least one sample. The NLTP is a gate element, and causes no delay.

Figure 14:
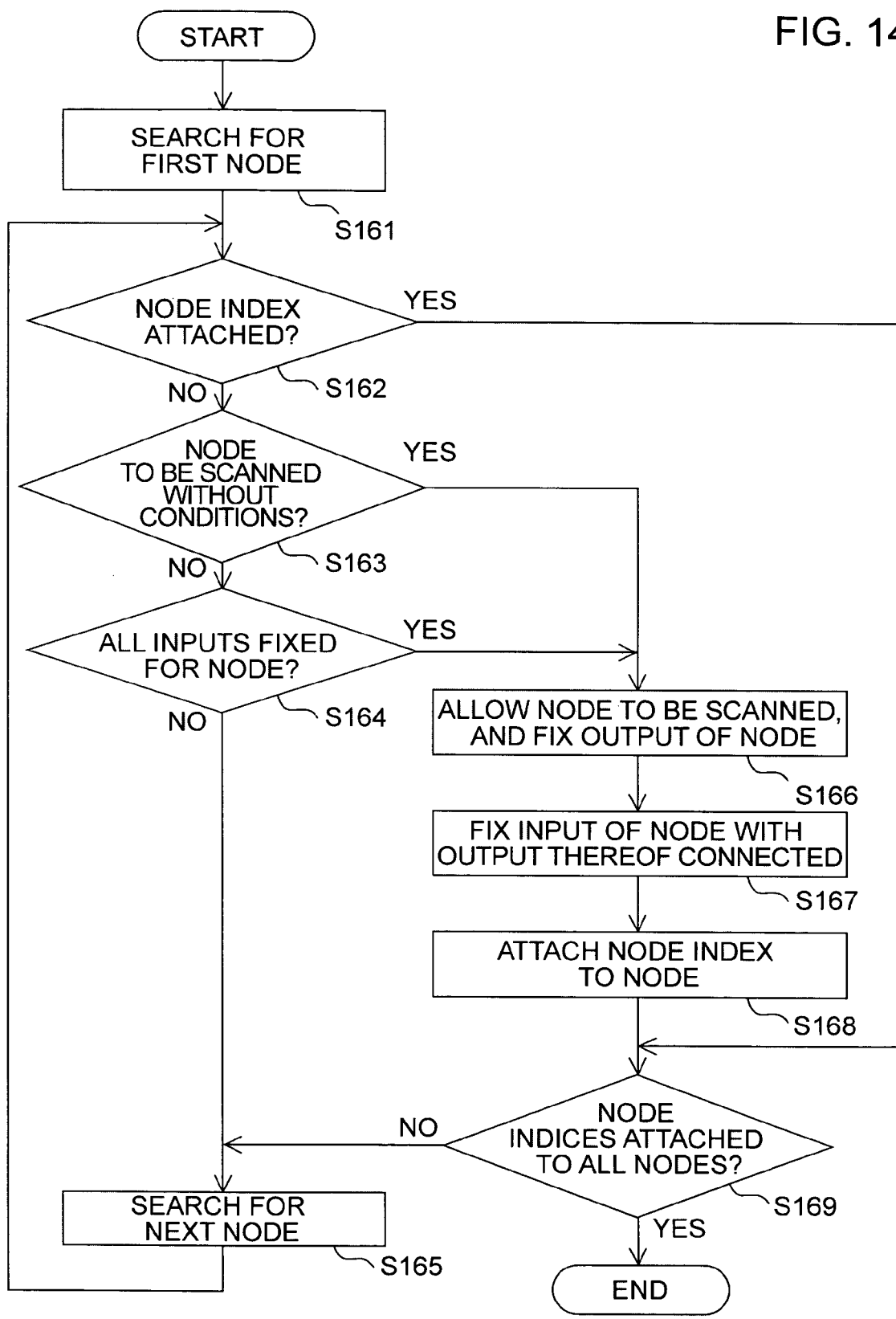
FIG. 14 is a flowchart illustrating an initial path search algorithm, namely, part of the path search algorithm of the signal processing apparatus in accordance with the embodiment of the present invention.

The initial path search algorithm is executed in accordance with a flowchart of FIG. 14.

A first node is checked (step S161), and it is determined in step S162 whether the first node is assigned the node sequence number (hereinafter referred to as a node index). If it is determined that the first node is assigned with the node index, it is also determined in step S169 whether all nodes are assigned with node indices. If it is determined that all nodes are assigned the respective node indices, the process routine ends.

If it is determined in step S169 that all nodes are not yet assigned respective node indices, a next node is checked (step S165). The process routine returns to step S162 to repeat step S162 and subsequent steps.

If it is determined in step S162 that the first node is not assigned the node index, it is determined in step S163 whether the first node is to be scanned unconditionally, in other words, whether the first node as a plugin is an LTP.

If it is determined in step S163 that the first node is not to be scanned unconditionally, it is determined in step S164 whether all inputs to the node are fixed. If it is determined in step S164 that all inputs are not fixed, a next node is checked (step S165). The process routine returns to step S162 to repeat step S162 and subsequent steps.

If it is determined in step S163 that the node is to be scanned unconditionally, or if it is determined in step S164 that all inputs to the node are fixed, the output of that node is fixed after scanning that node (step S166). The input of a node connected to the node is fixed (step S167). That node is then assigned a node index (step S168).

If it is determined in step S169 whether all nodes are assigned respective node indices. If it is determined that all nodes are assigned respective node indices, the process routine ends.

Figure 15:
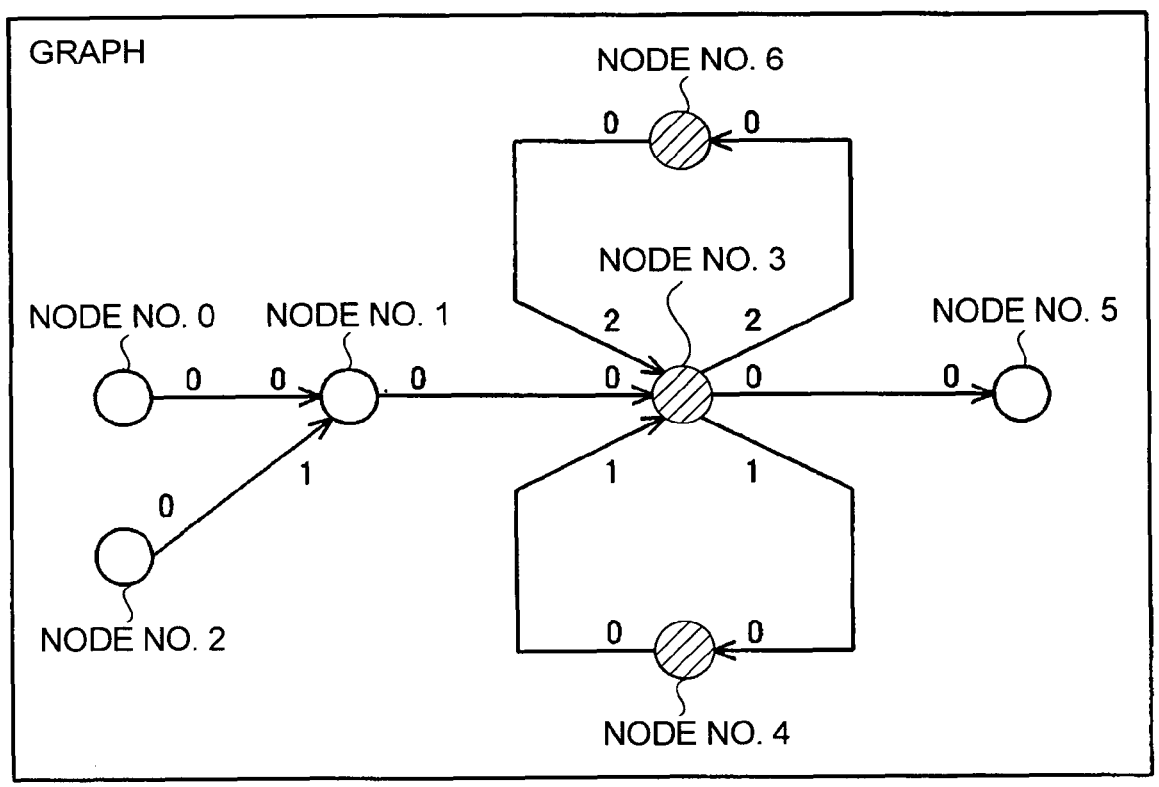
FIG. 15 is a flowchart illustrating the initial path search algorithm of the signal processing apparatus in accordance with the embodiment of the present invention.

A specific example of the node index assignment in accordance with the initial path search algorithm is described below with reference to FIG. 15. FIG. 15 illustrates a circuit arrangement of the graph. As shown, target nodes are seven, namely, nodes No. 0-No. 6. The nodes No. 4 and No. 6 are LTPs. The initial path search algorithm functions as discussed below. Nodes No. 0 through No. 6 are checked in sequence. Nodes No. 0 through No. 6 are checked in one cycle and the check cycle is repeated until all nodes are scanned.

(1) Node No. 1 with no input is scanned successfully, and the output (0) of node No. 1 is thus fixed.

(2) Node No. 1 is skipped because the input (1) of node No. 1 is not fixed.

(3) Node No. 2 with no input is scanned successfully and the output (0) of node No. 2 is fixed.

(4) Node No. 3 is skipped because none of inputs (0, 1, and 2) is fixed.

(5) Node No. 4 is LTP, and is scanned successfully. The output (0) of node No. 4 is fixed.

(6) Node No. 5 is skipped because the input (0) thereof is not fixed.

(7) Node No. 6 is LTP, and is scanned successfully. The output (0) of node No. 6 is fixed.

One check cycle of the nodes is thus completed. A second check cycle is performed on nodes that have not yet scanned successfully with any output thereof unfixed as below.

(1) Node No. 1 is scanned successfully because all inputs (0 and 1) are fixed. The output (0) of node No. 1 is thus fixed.

(2) Node No. 3 is scanned successfully because all inputs (0, 1, and 2) are fixed. The outputs (0, 1, and 2) of node No. 3 are fixed.

(3) Node No. 5 is scanned successfully since the input (0) thereof is fixed. The output of node No. 5 is thus fixed.

All nodes are thus scanned with all outputs thereof fixed. The search operation is thus completed. In this case, the search operation is completed after two check cycles.

If the nodes are assigned the numbers in the order of fixing in the search procedure of the initial path search algorithm, the path search results are determined. The sequence number of each new node is the node index. FIG. 16 lists the search result of the circuit arrangement of the graph of FIG. 15.

The plugins in the graph are stored in the plugin generator and storage unit in the order of node indices. Each time the path search algorithm is executed, the storage order of the plugins in the plugin generator and storage unit is updated. During the signal processing, the graph calls the signal processing function of each plugin in the sequence of the node indices, thereby performing a desired signal process.

In the initial path search algorithm, the nodes are checked to second to third cycles until the solution to the proposition is determined. In the first search cycle, at least one node that can be scanned is found.

There is one exception. If an LTP as a delay element is not contained in a feedback, any node that can be scanned cannot be found in a first search cycle. That is an abnormal case in the circuit arrangement.

The digital signal processing theory requires that at least one delay element be contained in a feedback loop to satisfy the principle of causality. In accordance with the initial path search algorithm of the present embodiment, the above exception occurs if the user produces a circuit without following the above basic requirement.

In accordance with the initial path search algorithm of the present embodiment, the occurrence of the exceptional case is used to trigger an error message. More specifically, if the user produces a feedback circuit containing no delay element, the above-described exceptional case of the path search occurs in the initial path search algorithm. If the exceptional case is detected, the system warns the user to reconstruct the circuit.

The loop search algorithm is described below. The loop search algorithm lightens workload on a CPU during signal processing. Assuring real-time property in the signal processing is an important technique.

The search results obtained in the initial path search algorithm provide a desired circuit for signal processing. However, the search results obtained in the initial path search algorithm from a circuit arrangement including a feedback loop are not very much advantageous in terms of speed performance.

The circuit arrangement including a feedback loop must satisfy the principle of causality of the digital signal processing theory that "an output cannot be fixed in a state that an input remains unfixed." For this reason, the signal process of the plugin must be successively performed on a per sample unit basis in a circuit including a feedback loop. More specifically, on a per sample unit basis, the inputting and outputting of the audio data to and from the plugin and the signal process to the plugin must be performed.

Here, a function call to be performed at each signal process becomes a problem. In software process, the function call typically increases a workload on a CPU, thereby becoming costly. In the real-time software signal processing, the smaller the number of function calls, the higher the process performance speed becomes. A method of reducing the number of function calls is needed to heighten speed performance.

A process of handing a plurality of data samples, for example, a packet unit, as one unit is available as a typical method of reducing the function calls. Rather than processing the data one sample by one sample, the system processes the data block by block, each block containing a predetermined number of data samples. If a packet size is 1024 samples, the audio data of 1024 samples are unified into one block, and are processed in response to one function call. The number of function calls is reduced in this way.

If the circuit includes a feedback loop, the function call must be performed on a per sample unit basis. The packet process cannot be performed.

This drawback is overcome by performing the loop search algorithm subsequent to the initial path search algorithm.

A node forming a loop in the circuit including the feedback loop is typically part of the entire circuit. Taking advantage of this fact, a group of nodes forming a loop is separated from a group not forming a loop in the signal processing sequence in the loop search algorithm of the present embodiment. The packet process is enabled in the group of nodes not forming the loop to achieve high-speed performance in the entire signal processing.

In the circuit of FIG. 15, the nodes forming the loops are three, namely, node No. 3, node No. 4, and node No. 6, and are less than half the whole number of nodes, namely, 7.

The nodes forming the loops are processed on a per sample unit basis, while the remaining nodes are processed on a per packet unit basis. Reduction in speed performance is thus limited to minimum. The smaller the ratio of the nodes forming the loops in the entire circuit, the more efficiently the reduction in speed performance is controlled.

Figure 17:
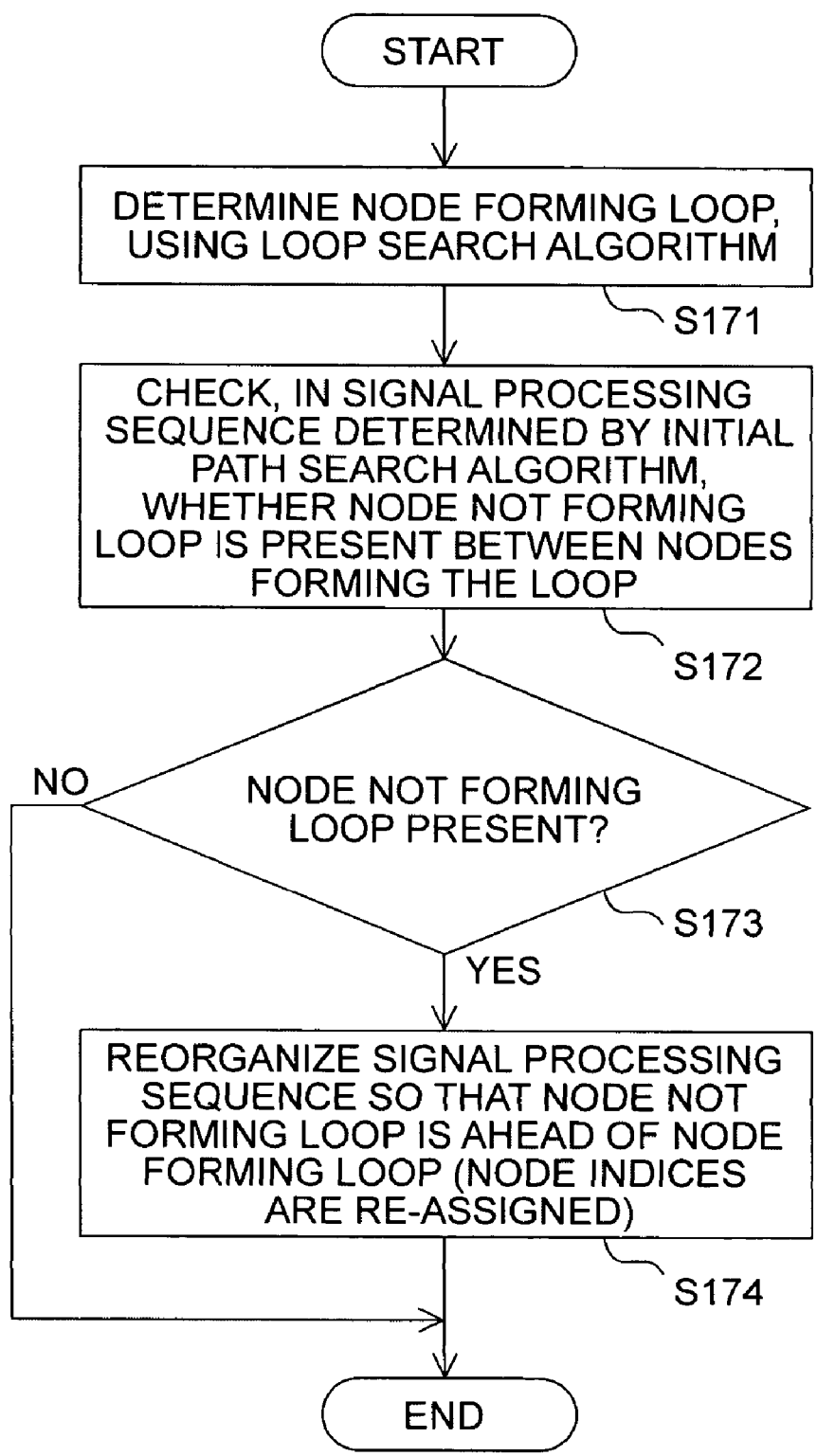
FIG. 17 is a flowchart illustrating a loop search algorithm forming part of the path search algorithm of the signal processing apparatus in accordance with the embodiment of the present invention.

FIG. 17 is a flowchart of the loop search algorithm. Nodes forming a loop are determined using the loop search algorithm (step S171). The loop search algorithm may be a typical loop search algorithm available from the graph theory. The typical loop search algorithm in the graph theory is well known, and is not detailed here.

If it is determined in step S172 whether a node not forming a loop is interposed between nodes forming a loop in the signal processing sequence determined in the initial path search algorithm.

If it is determined in step S173 that a node not forming a loop is interposed between nodes forming a loop in the signal processing sequence, the signal processing sequence is modified in step S174 so that the node not forming the loop precedes the nodes forming the loop. In other words, the nodes are re-assigned the node indices.

If it is determined in step S173 that a node not forming a loop is not interposed between nodes forming a loop in the signal processing sequence, the loop search algorithm ends.

The loop search algorithm applied to the circuit arrangement of FIG. 15 is specifically described below.

Figures 18A, 18B:
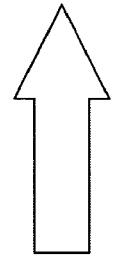
FIGS. 18A and 18B illustrate the loop search algorithm of the signal processing apparatus in accordance with the embodiment of the present invention.

FIG. 16 illustrates the results of the execution of the loop search algorithm to the circuit arrangement of FIG. 15. FIG. 18A illustrates the nodes determined, as shown in FIG. 16, as forming the loops in the loop search algorithm, namely, node No. 3, node No. 4, and node No. 6 in hatched areas.

FIG. 18A shows that node No. 1 not forming any loops is interposed between the nodes forming the loops in the signal processing sequence. In the signal processing apparatus as is, node No. 1, which would otherwise need not be processed on a per sample unit basis, must be processed on a per sample unit basis.

If the loop search algorithm is executed, the signal processing sequence is modified in step S174 so that a node not forming a loop precedes a node forming a loop.

Even with the modified signal processing sequence, the proposition of the initial path search algorithm must be satisfied. It is acceptable that whether the proposition of the initial path search algorithm is satisfied or not is checked subsequent to the modification of the signal processing sequence in the loop search algorithm. Alternatively, such a check operation is eliminated by placing the node not forming the loop ahead of a front node of the loop in the signal processing sequence. The above-referenced sequence modification keeps the sequence of signal processing in a correct state.

As shown in FIG. 15, node No. 4 and node No. 6 are LTPs, and have the feature that the output thereof is fixed even if the input thereof remains unfixed. Taking advantage of this feature, node No. 4 and node No. 6 may be processed subsequent to node No. 1.

As shown in FIG. 18B, the signal processing sequence is modified in the loop search algorithm so that node No. 1 forming no loop is third in the signal processing sequence, ahead of node No. 4 as a front node forming the loop.

The nodes forming the loops are grouped as hatched in FIG. 18B. The node group forming the loop is thus localized in the signal processing sequence.

The number of function calls is thus minimized by performing the signal process in the signal processing sequence of FIG. 18B as described below.

(1) The nodes having node indices 1 through 3 are outside the loop, and are processed on a per packet unit basis.

(2) The nodes having node indices 4 through 6 are within the loops, and are processed on a per sample unit basis.

(3) The node having index number 7 is outside the loop, and is thus processed on a per sample unit basis.

If the signal process is performed as described above, the number of function calls is reduced, and a speed performance drop in the signal process is avoided. For example, a signal process with a packet size of 1024 samples is described below.

(1) Data of 1204 samples is relayed to node No. 0 (one function call).

(2) Data of 1204 samples is relayed to node No. 2 (one function call).

(3) Data of 1204 samples is relayed to node No. 1 (one function call).

(4) Steps (4-1) through (4-3) are relayed by 1024 times (3×1204 function calls).

(4-1) Data of one sample is relayed to node No. 4 (one function call).

(4-2) Data of one sample is relayed to node No. 6 (one function call).

(4-3) Data of one sample is relayed to node No. 3 (one function call).

(5) Data of 1204 samples is relayed to node No. 5 (one function call).

In the above-referenced signal processing steps of (1) through (5), a total of 3076 function calls are required to process 1024 sample signals.

If all nodes were processed on a per sample unit basis, a total number of function calls would become 7168. The node scan algorithm of the present embodiment is performed to localize the node group forming the loop. The function call is performed on a per sample unit basis in only the node group. One function is performed on a per packet unit basis in the nodes not forming any loop. In the above-described example, about 57 percent of the function calls is thus eliminated.

In accordance with the system of the present embodiment, the packet size can be dynamically modified rather than being fixed.

As previously discussed, the signal processing apparatus of the present embodiment can calculate a sample accuracy, and can perform the AV synchronization at the sample accuracy. Known middlewares are subject to a delay proportional to the number of connections if a plurality of plugins are cascade-connected, and cannot process all plugins in synchronization.

In contrast, in accordance with the present embodiment, no increase is caused in delay in any connection, and the plugins are operable in synchronization at the sample accuracy. The AV synchronization is thus performed at the sample accuracy.

For AV synchronization, the system (graph) attaches a V synchronization flag as the vertical synchronization signal Vs of the audio data to the time information. Since the time information is updated on a per sample unit basis, the V synchronization flag is attached to all samples. The V synchronization flag becomes "0" at the timing of a front frame and becomes "1" in the rest of time.

The V flag is synchronization pulse information for associating the frame of video with a sample of the audio data. For example, if video information is 30 frames/s, and the sampling frequency of the audio data is 48 kHz, and the number of samples of the audio data per frame of the video information is 48000/30=1600 (samples/frame). To process the audio data per packet unit, the packet fails to match the frame if the number of samples per packet is 1024. The AV synchronization is performed using the V synchronization flag.

The system (graph) calculates beforehand the number of audio data samples per frame of the video information. When the audio data is input to a plugin in the system (graph), the V synchronization flag is also input together with sample time information of the audio data to the plugin. The V synchronization flag indicates whether the sample time is at the front of the video frame.

Upon detecting from the V synchronization flag that the input audio data is at the front of one frame of the video information, each plugin performs an AV synchronization process by updating the internally stored parameter in synchronization with the front of the video frame.

As a precondition to the AV synchronization, the time information of the sample unit from the system (graph) must associated with the V synchronization flag of the video frame by any method. In the signal processing apparatus of the present embodiment, the start time of signal process is defined as a front of the video frame, and time information subsequent to the start time is associated with the V synchronization flag using the number of audio data samples per one frame of the video information calculated beforehand by the system (graph).

Figure 19:
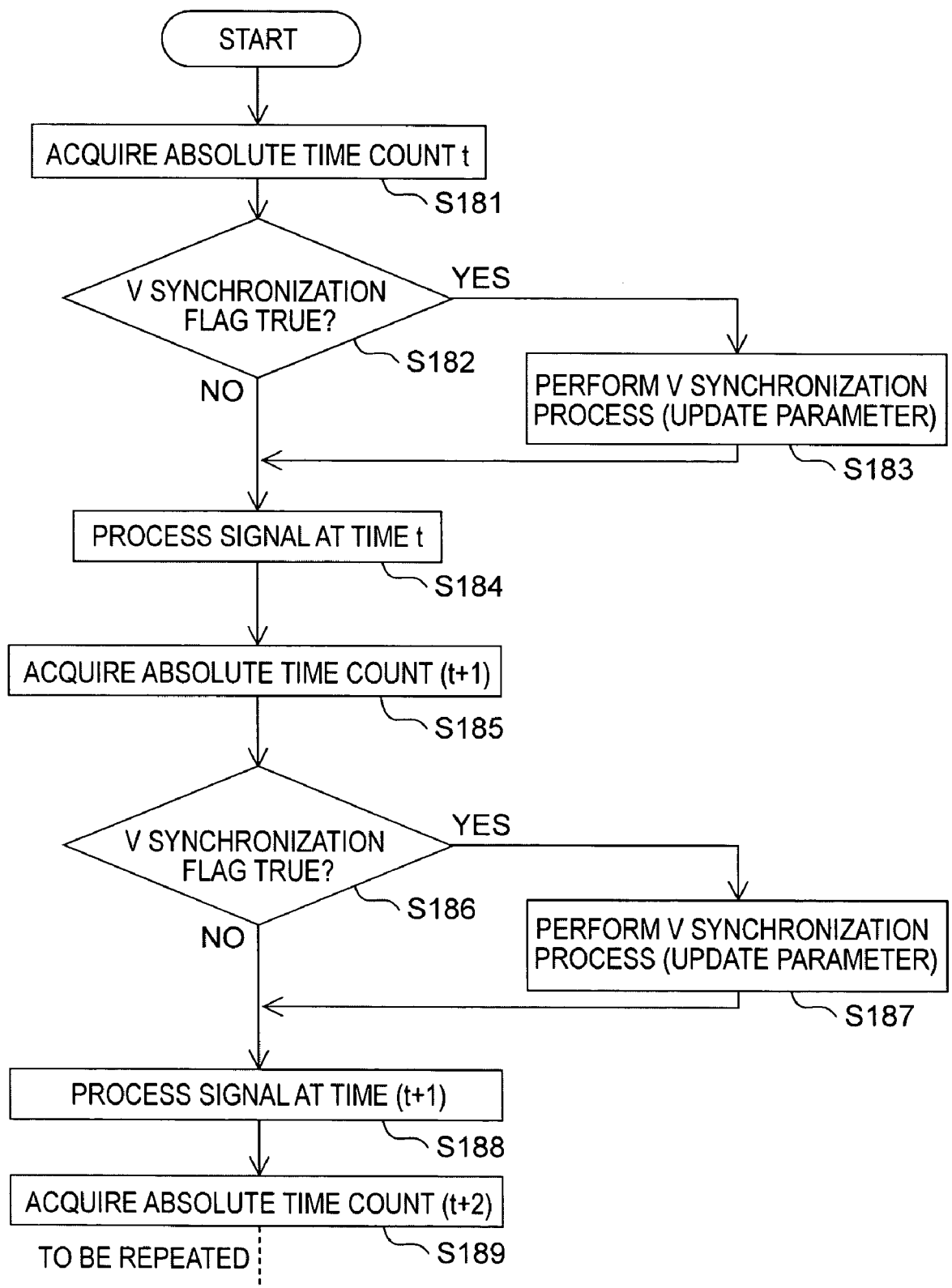
FIG. 19 is a flowchart illustrating an AV synchronization process of the signal processing apparatus in accordance with the embodiment of the present invention.

FIG. 19 is a flowchart of the AV synchronization performed by the plugin.

In synchronization with the inputting of the audio data sample to the plugin, absolute time count t is acquired as the time information input to the plugin from the system (step S181). The system writes the time information on a per sample unit basis. The V synchronization flag attached to the time information is also acquired from the system.

Depending on whether the V synchronization flag on a per sample unit basis is "1", the plugin checks whether the V synchronization flag is "true", in other words, whether it is at the front of the video frame (step S182). If it is determined that the V synchronization flag is "true", the parameter is updated in the AV synchronization process (step S183). The signal process is thus performed at time t (step S184).

If it is determined that the V synchronization flag is not "true", the signal process is thus performed at time t (step S184) without updating the parameter (step S183).

A next absolute time count (t+1) input in synchronization with the inputting of a next audio sample to the plugin is acquired (step S185). The same process as steps S182-S184 is repeated (steps S186-S188). In synchronization with the inputting of the sample, the above process is repeated.

In accordance with the signal processing apparatus of the present embodiment, the graph structure is modified in response to the graph update command from the user even in the middle of the signal processing. Since the path search algorithm (node scan algorithm) is performed even in the middle of the signal process, the circuit arrangement is modified.

The user can thus modify the circuit arrangement of the signal processing apparatus of the present embodiment to a new one while listening to a sound processed and output by the signal processing apparatus. The signal processing apparatus of the present embodiment finds applications in live playing apparatuses.

Figure 20:
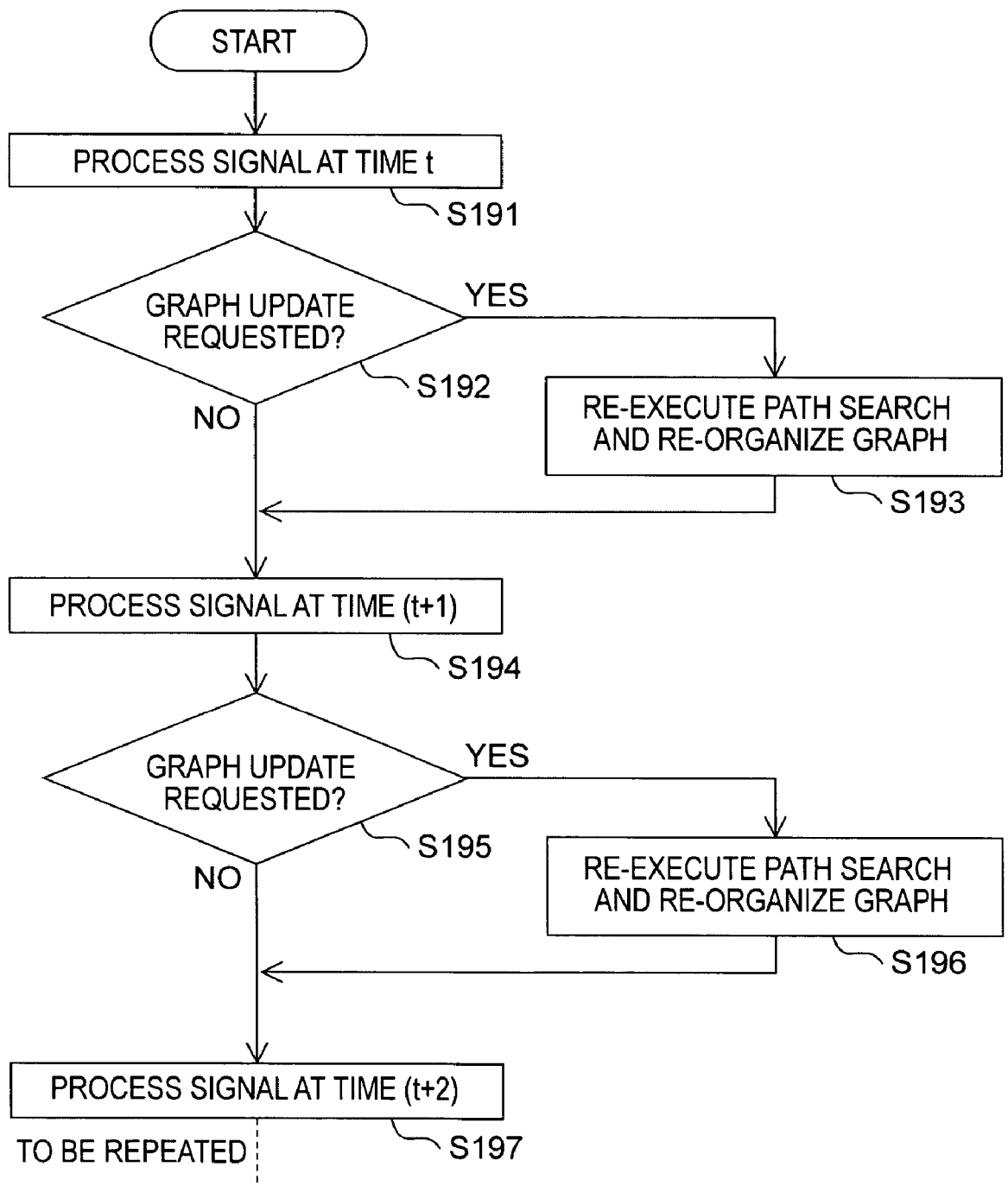
FIG. 20 is a flowchart illustrating a dynamic update process of a circuit arrangement of the signal processing apparatus in accordance with the embodiment of the present invention.

FIG. 20 is a flowchart of the dynamic modification of the circuit arrangement. The process of the flowchart is mainly performed by the graph.

The signal process is performed at time t (step S191). Even in the middle of the signal process, the graph determines whether one of the plugin generation and deletion command, the input and output port generation and connection command, and the graph modification command is issued (step S192).

If it is determined in step S192 that the graph modification command is issued, the graph performs the path search while re-structuring the circuit arrangement of the graph (step S193). The signal process at time (t+1) is performed (step S194). If it is determined in step S192 that the graph modification command is not issued, processing proceeds to the signal process at time (t+1) (step S194).

In step S194 thereafter, the same process as in steps S192-S193 is repeated (steps S195-S196).

As previously discussed, parameter attributes may be entered in the signal process of the signal processing apparatus of the present embodiment. The parameter herein refers to a multiplication factor in the case of a multiplier.

Figure 21:
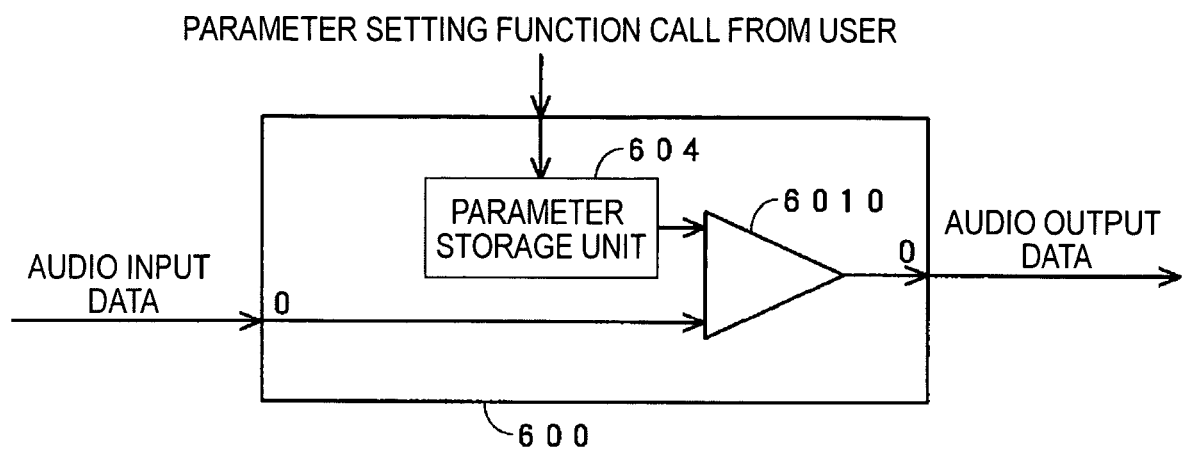
FIG. 21 illustrates a parameter setting method of the signal processing apparatus in accordance with the embodiment of the present invention.

Ordinary middlewares permit the parameter to be intermittently modified in response to a parameter setting function from the user. The signal processing apparatus of this embodiment has a structure identical to a known one shown in FIG. 21. More specifically, the plugin 600 includes the parameter storage unit 604 as shown in FIG. 6. The parameter storage unit 604 is designed to allow the setting to be modified intermittently in response to the parameter setting function from the user. As shown in FIG. 21, a signal processor 6010 is a gain control amplifier, and the gain of the signal processor 6010 is controlled by a parameter stored in a parameter storage unit 604.

In the arrangement of FIG. 21, the parameter cannot be varied continuously and accurately on a per sample unit basis. Widely available operating systems (OS's) have difficulty in assuring real-time feature to one sample time (of about 20 microseconds) of the audio data sample, and intervals between function calls become as long as several tens of milliseconds. Even if the real-time feature is assured on an ordinary OS, an accuracy level of several milliseconds to several tens of milliseconds is the maximum level achievable. Because of time variations in software, timing control of parameter modification function cannot be performed to within the sample accuracy level on the order of several microseconds.

In accordance with the present embodiment, the parameter setting method is improved to accurately vary the parameter to within one sample accuracy. More specifically, the parameter stored in the plugin is not set in response to the function call from the user. The graph is provided with the function that assigns the function call to the input port of the plugin. A new parameter setting method is implemented. The new parameter setting method is referred to as parameter binding.

Figure 22:
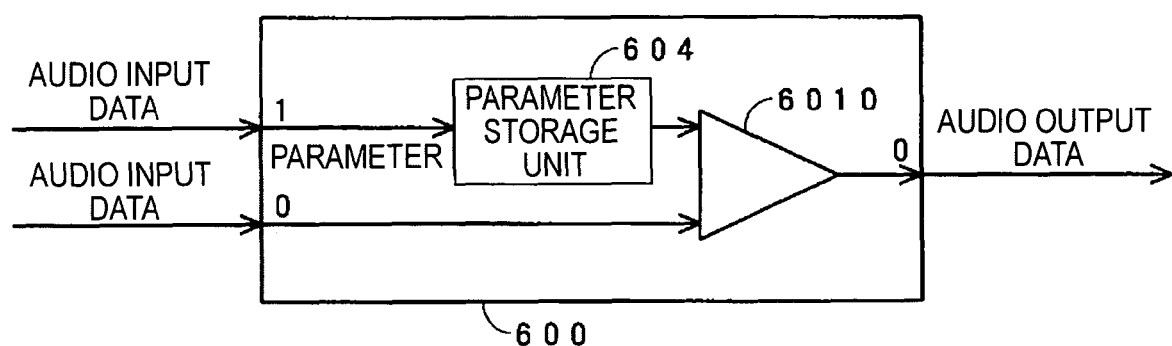
FIG. 22 illustrates another parameter setting method of the signal processing apparatus in accordance with the embodiment of the present invention.

FIG. 22 illustrates an example of parameter binding. A new input port 1 is arranged on the plugin, and is connected to the parameter storage unit 604. An audio data value is assigned to the input port 1.

The parameter in the plugin is not updated in response to the setting function call from the user but in response to the audio data value input to the input port 1. The audio data value as is becomes a parameter value, and updated by sample unit.

In this case, there is no particular distinction between the parameter and the audio data. Since the audio data are synchronized with each other at the sample accuracy in accordance with the present embodiment, synchronization between the parameter updating and the audio data is maintained. For example, the user generates a parameter signal synchronized with the audio data, and inputs the parameter signal to the input port connected to the parameter storage unit of a desired plugin. The parameter modification is performed in synchronization with the audio data at the sample accuracy level.

Figure 23:
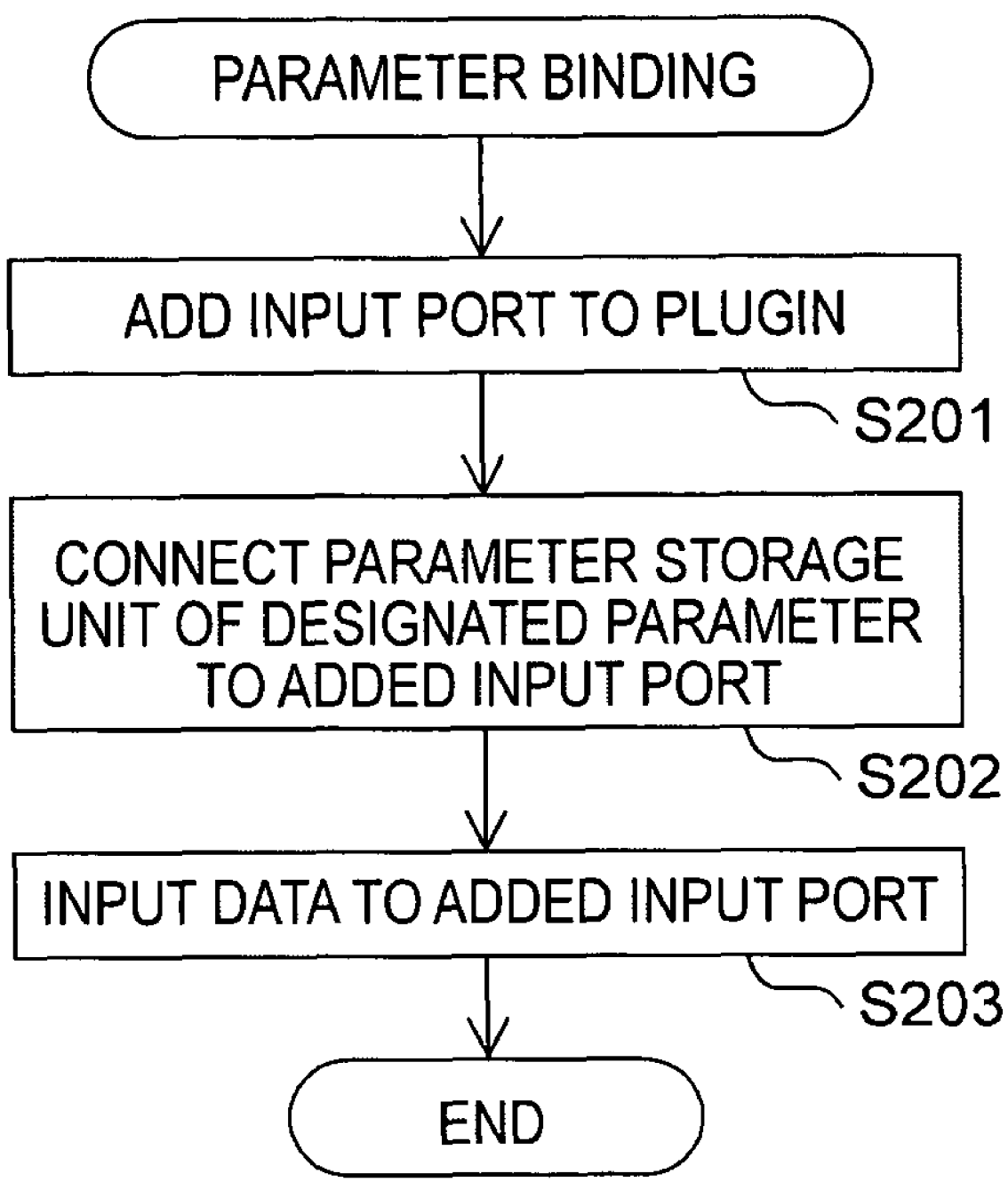
FIG. 23 is a flowchart illustrating another example of the parameter setting method of FIG. 22.

FIG. 23 illustrates a registration procedure of parameter binding the graph. An input port for parameter binding is added to a plugin to be parameter bound (step S201). The input port added in step S201 is connected to a parameter storage unit that is to store a specified parameter (step S202).

The audio data functioning as the parameter is input to the added input port (step S203). The registration of parameter binding has been completed.

Figure 24:
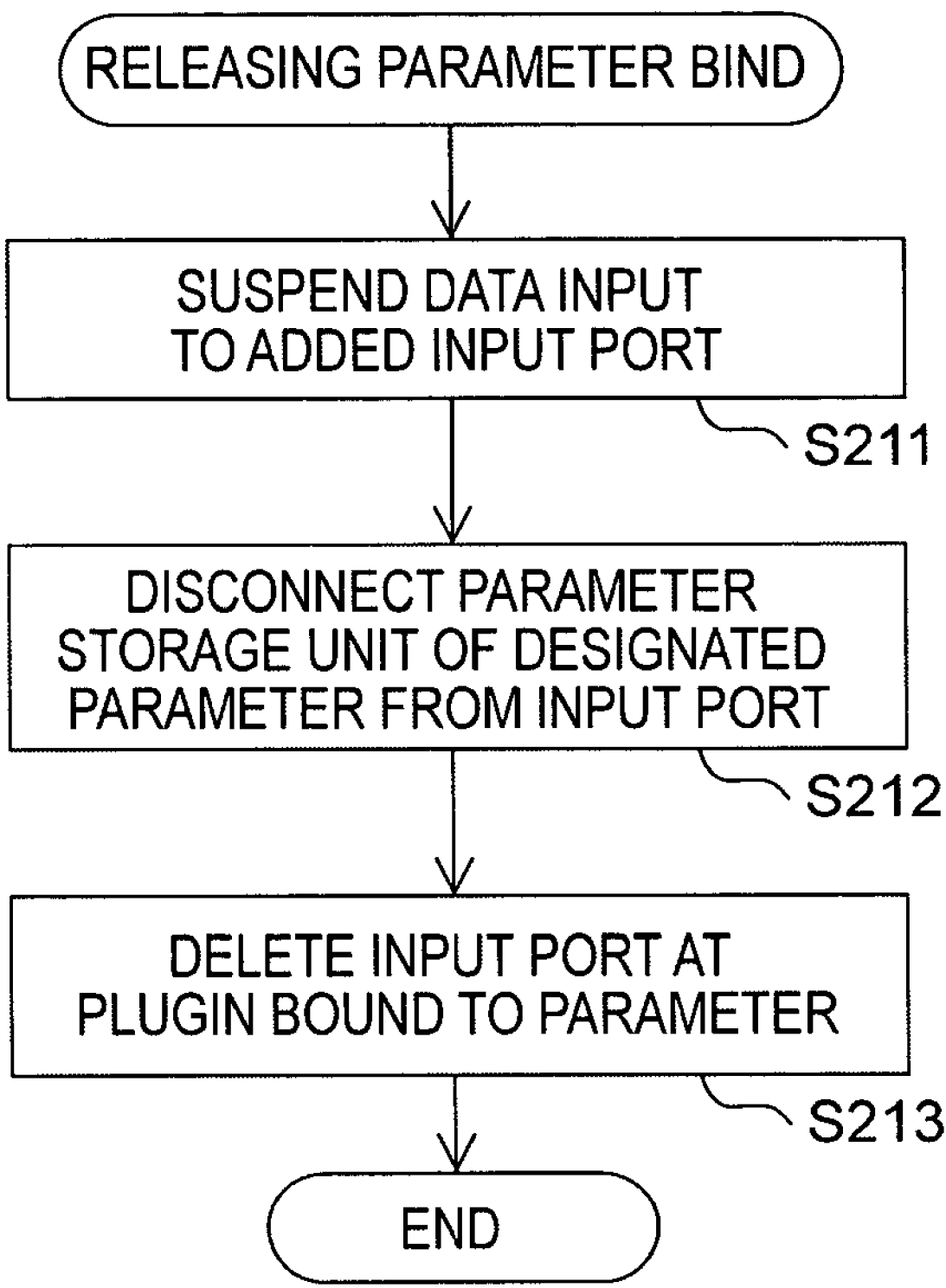
FIG. 24 is a flowchart illustrating yet another example of the parameter setting method of FIG. 22.

FIG. 24 illustrates a procedure of releasing the registered parameter bind. Data inputting to the input port for parameter binding added to the predetermined plugin is suspended (step S211). The input port with data input suspended thereto is disconnected from the parameter storage unit to store the parameter (step S212). The input port with data input suspended thereto is thus deleted (step S213). The release procedure for releasing the registered parameter bind from the graph is thus completed.

The registration and release of the parameter bind can be performed at any timing, even in the middle of signal processing.

The signal processing apparatus of the present embodiment is implemented by a single computer, and the signal process is performed on the single computer. By sharing the signal process among a plurality of computers connected via a network, CPU workload is distributed on a real-time basis.

Distributed processing is implemented using a distributed object technique as one of widely available computing techniques. For example, techniques called COM/DCOM (component object model/distributed component object model) and COBRA (common object request broker architecture) are those techniques.

The case of COM/DCOM technique mainly used on Windows® based OS's is described below. The objects of the plugin in the middleware in the present embodiment are implemented as COM objects. The COM object is an object-oriented component model, and is characteristic of location transparency. The location transparency refers to a function that a COM object is generated on a remote computer as if a COM object were generated on a local computer.

With the location transparency, an object is generated using the same operation regardless of the local computer or the remote computer. The object of the plugin as the COM object is consistently generated on a plurality of computers without being aware of a network. Not only the generation of the plugin but also other processes are performed using a consistent operation regardless of the local computer or the remote computer.

For example, an audio input and output plugin object is arranged on the local computer while an echo plugin object is arranged on the remote computer, and a whole circuit is formed of the two objects.

FIG. 25 illustrates the structure of a graph performing a real-time distributed process. As shown in FIG. 25, a root graph 2500 includes a local computer 1000 and a remote computer 2000 connected to the local computer 1000 via a circuit 3000. A circuit is thus formed.

With reference to FIG. 25, the flow of the circuit production is discussed. The user produces a circuit on the local computer 1000 as if using only the local computer 1000. The user is aware of the remote computer 2000 in only a portion of the whole process.

(1) The user produces an object as the root graph 2500. The object as the root graph 2500 is generated on the local computer 1000.

(2) The user commands the object as the root graph 2500 to generate an object as a plugin 2501.

(3) The user commands the object as the root graph 2500 to generate an object as a plugin 2502.

(4) The user commands the object as the root graph 2500 to generate an object as a plugin 2503. An identifier of the remote computer 2000 is attached to a plugin generation function.

(5) The user commands the object as the root graph 2500 to generate an object as a plugin 2504.

(6) The user commands the object as the root graph 2500 to connect an output port 0 of the plugin 2501 to an input port 0 of the plugin 2502.

(7) The user commands the object as the root graph 2500 to connect an output port 0 of the plugin 2502 to an input port 0 of the plugin 2503.

(8) The user commands the object as the root graph 2500 to connect an output port 0 of the plugin 2503 to an input port 0 of the plugin 2504.

(9) The user commands the object as the root graph 2500 to connect an output port 0 of the plugin 2504 to an input port 1 of the plugin 2502.

The circuit is completed. The user is aware of the remote computer 2000 in step (4) only. The execution of the signal processing described above is not different from that performed by the local computer 1000 only.

The above-reference embodiment provides the following advantages.

With signal processing stages cascaded, a circuit causing no increase in process delay in the software signal process is provided. Any digital signal processing circuit containing a feedback structure is generated.

The circuit arrangement of a digital signal processing circuit is dynamically updated. In this case, circuit elements dynamically updatable includes the addition and deletion of the plugin, the connection state between the plugins, the addition and deletion of the input and output ports of the plugins, the parameter modification and parameter binding of the plugin, and parameters relating to the signal process, such as a packet size, and a sampling frequency during the signal process.

A product containing a dynamically updatable circuit is produced by implementing the middleware of the signal processing apparatus of the present embodiment.

The produced signal processing circuit is stored in a file for later use. By exchanging such a file, the circuit is exchanged or reused.

Even if the signal processing circuit includes a circuit arrangement having a feedback loop, the number of signal processing function calls is minimized. As a result, a CPU workload required to perform the real-time signal process is reduced.

The synchronization between the updating of the circuit parameter and the audio data is controlled to within the sample accuracy. The parameter value is updated using the audio data (parameter binding function).

The real-time distributed process is performed using a network. A plurality of circuits over the network are operated in synchronization on a real-time basis.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus for performing signal processing using a plurality of signal processing modules associated with a corresponding plurality of signal processing functions, the signal processing apparatus comprising:

graphical display means for graphically displaying the plurality of signal processing modules;

input command receiving means for receiving one or more of a plurality of available commands from a user, the plurality of available commands including a command to generate at least one of the plurality of signal processing modules, a command to delete at least one of the plurality of signal processing modules, and a command to connect an input of a given one of the plurality of signal processing modules to an output of a further one of the plurality of signal processing modules;

signal processing module interconnection means for setting a virtual connection state of the plurality of signal processing modules that defines connections among the inputs and outputs of the plurality of signal processing modules in response to the one or more received commands;

circuit arrangement information storage and management means for storing and managing the virtual connection state of the plurality of signal processing modules set by the signal processing module interconnection means;

signal processing sequence determining means for determining, through one or more of an initial path search and a loop search, a sequence of corresponding signal processing functions based on the virtual connection state of the plurality of signal processing modules stored in the circuit arrangement information storage and management means; and signal processing executing means for performing signal processing in accordance with the sequence of signal processing functions determined by the signal processing sequence determining means, wherein the signal processing sequence determining means (a) performs an initial path search to determine an initial sequence of signal processing functions which corresponds to an initial virtual connection state of the stored signal processing modules, (b) performs an initial loop search to detect respective ones of the plurality of signal processing modules that form a closed feedback loop, and (c) re-orders the initial sequence of signal processing functions if, in the initial sequence of signal processing functions, one of the signal processing modules which are not of the closed loop is interposed between two of the signal processing modules that form the closed loop, so that the interposed one of the signal processing modules is moved ahead of, in processing sequence, the signal processing modules that form the closed loop.

2. The signal processing apparatus according to claim 1, wherein when the command to generate or the command delete at least one of the plurality of signal processing modules is received from the user and/or a circuit arrangement update request to update a plurality of circuits based on the connection command of the input and output of each of the plurality of signal processing modules from the user is issued in the middle of the signal process performed by the signal processing executing means, the signal processing sequence determining means searches a new sequence of signal processing functions, and the signal processing executing means executes the signal processing in accordance with the new sequence of signal processing functions.

3. The signal processing apparatus according to claim 1, wherein the signal processing modules forming the closed loop process a signal by sample unit, and wherein the signal processing module not of the closed loop processes the signal by block unit, the block unit containing a plurality of samples of the signal.

4. The signal processing apparatus according to claim 1, further comprising a plurality of signal processors connected via a network, wherein the plurality of signal processing modules are distributed among the plurality of signal processors.

5. A signal processing apparatus for performing signal processing using a plurality of signal processing modules associated with a corresponding plurality of signal processing functions, the signal processing apparatus comprising:

graphical display means for graphically displaying the plurality of signal processing modules;

input command receiving means for receiving one or more of a plurality of available commands from a user, the plurality of available commands including a command to generate at least one of the plurality of signal processing modules, a command to delete at least one of the plurality of signal processing modules, and a command to connect an input of a given one of the plurality of signal processing modules to an output of a further one of the plurality of signal processing modules;

signal processing module interconnection means for setting a virtual connection state of the plurality of signal processing modules that defines connections among the inputs and outputs of the plurality of signal processing modules in response to the one or more received commands;

circuit arrangement information storage and management means for storing and managing the virtual connection state of the plurality of signal processing modules set by the signal processing module interconnection means;

signal processing sequence determining means for determining a sequence of corresponding signal processing functions based on the virtual connection state of the plurality of signal processing modules stored in the circuit arrangement information storage and management means; and signal processing executing means for performing signal processing in accordance with the sequence of signal processing functions determined by the signal processing sequence determining means, wherein in response to the command to generate or the command delete at least one of the plurality of signal processing modules being received from the user, the signal processing sequence determining means searches a new sequence of signal processing functions, and the signal processing executing means executes the signal processing in accordance with the new sequence of signal processing functions, and in response to a circuit arrangement update request to update a plurality of circuits based on the connection command of the input and output of each of the plurality of signal processing modules from the user being issued in the middle of the signal process performed by the signal processing executing means, the signal processing sequence determining means searches a new sequence of signal processing functions, and the signal processing executing means executes the signal processing in accordance with the new sequence of signal processing functions.

6. The signal processing apparatus according to claim 5, further comprising a plurality of signal processors connected via a network, wherein the plurality of signal processing modules are distributed among the plurality of signal processors.

7. A signal processing apparatus for performing signal processing using a plurality of signal processing modules associated with a corresponding plurality of signal processing functions, the signal processing apparatus comprising:

a plurality of signal processing modules for processing, in software, the plurality of signal processing units;

input command receiving means for receiving one or more of a plurality of available commands from a user, the plurality of available commands including a command to generate at least one of the plurality of signal processing modules, a command to delete at least one of the plurality of signal processing modules, and a command to connect an input of a given one of the plurality of signal processing modules to an output of a further one of the plurality of signal processing modules;

signal processing module interconnection means for setting a virtual connection state of the plurality of signal processing modules that defines connections among the inputs and outputs of the plurality of signal processing modules in response to the one or more received commands;

circuit arrangement information storage and management means for storing and managing the virtual connection state of the plurality of signal processing modules set by the signal processing module interconnection means;

signal processing sequence determining means for determining a sequence of corresponding signal processing functions based on the virtual connection state of the plurality of signal processing modules stored in the circuit arrangement information storage and management means;

signal processing executing means for performing signal processing in accordance with the sequence of signal processing functions determined by the signal processing sequence determining means, wherein the signal processing module comprises a parameter storage unit storing a signal processing parameter set by the user, the reading of the signal processing parameter from the parameter storage unit being synchronized with a sample of a target signal, and wherein the signal processing sequence determining means (a) performs an initial path search to determine an initial sequence of signal processing functions which corresponds to an initial virtual connection state of the stored signal processing modules, (b) performs an initial loop search to detect respective ones of the plurality of signal processing modules that form a closed feedback loop, and (c) re-orders the initial sequence of signal processing functions if, in the initial sequence of signal processing functions, one of the signal processing modules which are not of the closed loop is interposed between two of the signal processing modules that form the closed loop, so that the interposed one of the signal processing modules is moved a head of, in processing sequence, the signal processing modules that form the closed loop.

8. The signal processing apparatus according to claim 7, further comprising a plurality of signal processors connected via a network, wherein the plurality of signal processing modules are distributed among the plurality of signal processors.

9. A signal processing apparatus for performing signal processing using a plurality of signal processing modules associated with a corresponding plurality of signal processing functions, the signal processing apparatus comprising:

graphical display means for graphically displaying the plurality of signal processing modules;

input command receiving means for receiving one or more of a plurality of available commands from a user, the plurality of available commands including a command to generate at least one of the plurality of signal processing modules, a command to delete at least one of the plurality of signal processing modules, and a command to connect an input of a given one of the plurality of signal processing modules to an output of a further one of the plurality of signal processing modules;

signal processing module interconnection means for setting a virtual connection state of the plurality of signal processing modules that defines connections among the inputs and outputs of the plurality of signal processing modules in response to the one or more received commands;

circuit arrangement information storage and management means for storing and managing the virtual connection state of the plurality of signal processing modules set by the signal processing module interconnection means;

signal processing sequence determining means for determining a sequence of corresponding signal processing functions based on the virtual connection state of the plurality of signal processing modules stored in the circuit arrangement information storage and management means;

signal processing executing means for performing signal processing in accordance with the sequence of signal processing functions determined by the signal processing sequence determining means;

means for supplying the plurality of signal processing modules with a signal processing parameter as a signal input, wherein inputting of the signal processing parameter is synchronized with a sample of a target signal, and wherein the signal processing sequence determining means (a) performs an initial path search to determine an initial sequence of signal processing functions which corresponds to an initial virtual connection state of the stored signal processing modules, (b) performs an initial loop search to detect respective ones of the plurality of signal processing modules that form a closed feedback loop, and (c) re-orders the initial sequence of signal processing functions if, in the initial sequence of signal processing functions, one of the signal processing modules which are not of the closed loop is interposed between two of the signal processing modules that form the closed loop, so that the interposed one of the signal processing modules is moved a head of, in processing sequence, the signal processing modules that form the closed loop.

10. The signal processing apparatus according to claim 9, further comprising a plurality of signal processors connected via a network, wherein the plurality of signal processing modules are distributed among the plurality of signal processors.

11. A signal processing apparatus for performing signal processing using a plurality of signal processing modules associated with a corresponding plurality of signal processing functions, the signal processing apparatus comprising:

a graphical display unit graphically displaying the plurality of signal processing modules;

an input command receiving unit receiving one or more of a plurality of available commands from a user, the plurality of available commands including a command to generate at least one of the plurality of signal processing modules, a command to delete at least one of the plurality of signal processing modules, and a command to connect an input of a given one of the plurality of signal processing modules to an output of a further one of the plurality of signal processing modules;

a signal processing module interconnection unit setting a virtual connection state of the plurality of signal processing modules that defines connections among the inputs and outputs of the plurality of signal processing modules in response to the one or more received commands;

a circuit arrangement information storage and management unit storing and managing the virtual connection state of the plurality of signal processing modules set by the signal processing module interconnection unit;

a signal processing sequence determining unit determining, through one or more of an initial path search and a loop search, a sequence of corresponding signal processing functions based on the virtual connection state of the plurality of signal processing modules stored in the circuit arrangement information storage and management unit; and a signal processing executing unit performing signal processing in accordance with the sequence of signal processing functions determined by the signal processing sequence determining unit, wherein the signal processing sequence determining unit (a) performs an initial path search to determine an initial sequence of signal processing functions which corresponds to an initial virtual connection state of the stored signal processing modules, (b) performs an initial loop search to detect respective ones of the plurality of signal processing modules that form a closed feedback loop, and (c) re-orders the initial sequence of signal processing functions if, in the initial sequence of signal processing functions, one of the signal processing modules which are not of the closed loop is interposed between two of the signal processing modules that form the closed loop, so that the interposed one of the signal processing modules is moved ahead of, in processing sequence, the signal processing modules that form the closed loop.

12. A signal processing apparatus for performing signal processing using a plurality of signal processing modules associated with a corresponding plurality of signal processing functions, the signal processing apparatus comprising:

a graphical display unit graphically displaying the plurality of signal processing modules;

an input command receiving unit receiving one or more of a plurality of available commands from a user, the plurality of available commands including a command to generate at least one of the plurality of signal processing modules, a command to delete at least one of the plurality of signal processing modules, and a command to connect an input of a given one of the plurality of signal processing modules to an output of a further one of the plurality of signal processing modules;

a signal processing module interconnection unit setting a virtual connection state of the plurality of signal processing modules that defines connections among the inputs and outputs of the plurality of signal processing modules in response to the one or more received commands;

a circuit arrangement information storage and management unit storing and managing the virtual connection state of the plurality of signal processing modules set by the signal processing module interconnection unit;

a signal processing sequence determining unit determining a sequence of corresponding signal processing functions based on the virtual connection state of the plurality of signal processing modules stored in the circuit arrangement information storage and management unit; and a signal processing executing unit performing signal processing in accordance with the sequence of signal processing functions determined by the signal processing sequence determining unit, wherein in response to the command to generate or the command delete at least one of the plurality of signal processing modules being received from the user, the signal processing sequence determining unit searches a new sequence of signal processing functions, and the signal processing executing unit executes the signal processing in accordance with the new sequence of signal processing functions, and in response to a circuit arrangement update request to update a plurality of circuits based on the connection command of the input and output of each of the plurality of signal processing modules from the user being issued in the middle of the signal process performed by the signal processing executing unit, the signal processing sequence determining unit searches a new sequence of signal processing functions, and the signal processing executing unit executes the signal processing in accordance with the new sequence of signal processing functions.

13. A signal processing apparatus for performing signal processing using a plurality of signal processing modules associated with a corresponding plurality of signal processing functions, the signal processing apparatus comprising:

a graphical display unit graphically displaying the plurality of signal processing modules;

an input command receiving unit receiving one or more of a plurality of available commands from a user, the plurality of available commands including a command to generate at least one of the plurality of signal processing modules, a command to delete at least one of the plurality of signal processing modules, and a command to connect an input of a given one of the plurality of signal processing modules to an output of a further one of the plurality of signal processing modules;

a signal processing module interconnection unit setting a virtual connection state of the plurality of signal processing modules that defines connections among the inputs and outputs of the plurality of signal processing modules in response to the one or more received commands;

a circuit arrangement information storage and management unit storing and managing the virtual connection state of the plurality of signal processing modules set by the signal processing module interconnection unit;

a signal processing sequence determining unit determining a sequence of corresponding signal processing functions based on the virtual connection state of the plurality of signal processing modules stored in the circuit arrangement information storage and management unit;

a signal processing executing unit performing signal processing in accordance with the sequence of signal processing functions determined by the signal processing sequence determining unit, wherein the signal processing module comprises a parameter storage unit storing a signal processing parameter set by the user, the reading of the signal processing parameter from the parameter storage unit being synchronized with a sample of a target signal, and wherein the signal processing sequence determining unit (a) performs an initial path search to determine an initial sequence of signal processing functions which corresponds to an initial virtual connection state of the stored signal processing modules, (b) performs an initial loop search to detect respective ones of the plurality of signal processing modules that form a closed feedback loop, and (c) re-orders the initial sequence of signal processing functions if, in the initial sequence of signal processing functions, one of the signal processing modules which are not of the closed loop is interposed between two of the signal processing modules that form the closed loop, so that the interposed one of the signal processing modules is moved a head of, in processing sequence, the signal processing modules that form the closed loop.

14. A signal processing apparatus, comprising:

a graphical display unit graphically displaying the plurality of signal processing modules;

an input command receiving one or more of a plurality of available commands from a user, the plurality of available commands including a command to generate at least one of the plurality of signal processing modules, a command to delete at least one of the plurality of signal processing modules, and a command to connect an input of a given one of the plurality of signal processing modules to an output of a further one of the plurality of signal processing modules;

a signal processing module interconnection unit setting a virtual connection state of the plurality of signal processing modules that defines connections among the inputs and outputs of the plurality of signal processing modules in response to the one or more received commands;

a circuit arrangement information storage and management unit storing and managing the virtual connection state of the plurality of signal processing modules set by the signal processing module interconnection unit;

a signal processing sequence determining unit determining a sequence of corresponding signal processing functions based on the virtual connection state of the plurality of signal processing modules stored in the circuit arrangement information storage and management unit;

a signal processing executing unit performing signal processing in accordance with the sequence of signal processing functions determined by the signal processing sequence determining unit;

a unit supplying the plurality of signal processing modules with a signal processing parameter as a signal input, wherein inputting of the signal processing parameter is synchronized with a sample of a target signal, and wherein the signal processing sequence determining unit
(a) performs an initial path search to determine an initial sequence of signal processing functions which corresponds to an initial virtual connection state of the stored signal processing modules,
(b) performs an initial loop search to detect respective ones of the plurality of signal processing modules that form a closed feedback loop, and
(c) re-orders the initial sequence of signal processing functions if, in the initial sequence of signal processing functions, one of the signal processing modules which are not of the closed loop is interposed between two of the signal processing modules that form the closed loop, so that the interposed one of the signal processing modules is moved a head of, in processing sequence, the signal processing modules that form the closed loop.

* * * * *